United States Patent [19]

Clevenger, Jr. et al.

[11] Patent Number: 4,856,612
[45] Date of Patent: Aug. 15, 1989

[54] METHOD OF CONTROLLING THE OPERATION OF A LOADER

[75] Inventors: James T. Clevenger, Jr., Lancaster; Dale A. Ashcroft, New Holland; Richard P. Strosser, Akron, all of Pa.; Mark S. Anderson, Prior Lake, Minn.

[73] Assignee: Ford New Holland, Inc., New Holland, Pa.

[21] Appl. No.: 154,676

[22] Filed: Feb. 10, 1988

[51] Int. Cl.⁴ .................... B60K 28/04; B60R 22/00
[52] U.S. Cl. .................................... 180/273; 180/268
[58] Field of Search .............. 180/267, 273, 270, 290

[56] References Cited

U.S. PATENT DOCUMENTS

| | | | |
|---|---|---|---|
| 4,096,468 | 6/1978 | Kopera, Jr. | 180/270 |
| 4,313,519 | 2/1982 | Lipschutz | 180/270 |
| 4,344,502 | 8/1982 | Terabayashi | 180/270 |
| 4,371,741 | 11/1982 | Leskoverc | 180/273 |
| 4,385,863 | 5/1983 | Minor | 180/273 |
| 4,389,154 | 6/1983 | Minor et al. | 180/273 |
| 4,466,504 | 8/1984 | Glandenoto et al. | 180/273 |

Primary Examiner—Richard A. Bertsch
Attorney, Agent, or Firm—Larry W. Miller; Frank A. Seemar; Darrell F. Marquette

[57] ABSTRACT

A method of controlling the operation of a loader to encourage the use of an operator restraint mechanism is disclosed wherein a first signal is generated by a seat sensor to indicate the presence of the operator in the operator seat and a second signal is generated by a sensor in the operator restraint mechanism to indicate use of the mechanism. The hydraulic system will not be enabled unless the second signal is generated immediately subsequent to the generation of the first signal. Unless the first and second signals are generated in the proper sequence, the starting of the engine will also be disabled. The generation of first and second inverse signals, indicating the lack of the presence of the operator in the seat and the disengagement of the operator restraint mechanism, respectively, will disable the loader hydraulic system. A delay is provided to permit the operator to vacate the seat for a short period of time without having to resequence the generation of the first and second signals to enable the loader hydraulic system.

12 Claims, 20 Drawing Sheets

| Fig.2a | Fig.2b |
|---|---|
| Fig.2c | Fig.2d |

METHOD OF CONTROLLING THE OPERATION OF A LOADER

BACKGROUND OF THE INVENTION

The present invention relates generally to industrial implements having hydraulically operated working tools and, more particularly, to a method of using an operator restraint interlock to control the operation of a skid steer loader.

It is desirable that the operator of industrial implements such as skid steer loaders remain seated in their operator seat with an operator restraint mechanism, such as a seat belt, engaged to restrain the operator from leaving the seat. By sensing both the presence of the operator in the seat and the engaging of the operator restraint mechanism, a controller can determine when the operator restraint mechanism is not being utilized in conjunction with the operator coming and going from his seat.

Seat interlocks for skid steer loaders, such as described in U.S. Pat. 4,385,863, issued to Ray C. Minor on May 31, 1983, merely sense the presence of the operator in the seat and operate to disable the hydraulic system when the operator is out of the seat. However, it is desirable to tie in the operation of the operator restraint mechanism with the seat sensor to control the operative functions of the loader and, thereby, encourage the use of the operator restraint mechanism.

SUMMARY OF THE INVENTION

It is an object of this invention to overcome the aforementioned disadvantages of the prior art by providing a method of controlling the operation of a loader utilizing a sequencing of signals from seat and seat belt sensors to enable the loader's starter relay and hydraulic system.

It is another object of this invention to encourage the use of the operator restraint mechanism during operation of the skid steer loader.

It is a feature of this invention that the loader engine is permitted to continue operation, once it has been started, without requiring any resequencing of the activation of the seat and seat belt sensors.

It is an advantage of this invention that the use of the operator restraint mechanism is encouraged.

It is another feature of this invention that a delay step provides some leeway for the operator to vacate his seat for a short period of time without requiring the sequenced generation of signals from the seat and seat belt sensors to enable the operation of the loader's hydraulic system.

It is still another object of this invention to require engagement of the operator restraint mechanism after the operator sits in his operator seat to enable the operation of the hydraulic system of the loader.

It is still another feature of this invention that the absence of the operator from the seat for a period of time greater than the period of time permitted by the delay mechanism requires a resequencing of the actuation of the seat and seat belt switches before the hydraulic system will be enabled.

It is another advantage of this invention that use of the operator restraint mechanism is more convenient than bypassing the operation of the controller.

It is yet another object of this invention that the generation of an inverse signal by the seat or seat belt sensors indicating the operator has vacated his sector the disengagement of the operator restraint mechanism will disable the loader's hydraulic system.

It is yet another feature of this invention that the inverse signal generated by the vacating of the operator seat is cancelled if a signal indicating a reoccupation of the operator seat is generated within a predetermined period of time.

These and other objects, features and advantages are accomplished according to the instant invention by providing a method of controlling the operation of a loader to encourage the use of an operator restraint mechanism wherein a first signal is generated by a seat sensor to indicate the presence of the operator in the operator seat and a second signal is generated by a sensor in the operator restraint mechanism to indicate use of the mechanism. The hydraulic system will not be enabled unless the second signal is generated immediately subsequent to the generation of the first signal. Unless the first and second signals are generated in the proper sequence, the starting of the engine will also be disabled. The generation of first and second inverse signals, indicating the lack of the presence of the operator in the seat and the disengagement of the operator restraint mechanism, respectively, will disable the loader hydraulic system. A delay is provided to permit the operator to vacate the seat for a short period of time without having to resequence the generation of the first and second signals to enable the loader hydraulic system.

BRIEF DESCRIPTION OF THE DRAWINGS

The advantages of this invention will become apparent upon consideration of the following detailed disclosure of the invention, especially when taken in conjunction with the accompanying drawings wherein.

5 is a schematic diagram of a portion of the hydraulic and electrical circuits of the skid steer loader showing the hydraulic solenoid valves as pertain to the instant invention.

DETAILED DESCRIPTION OF THE PREFERRED EMBODIMENT

Figures 1, 2:
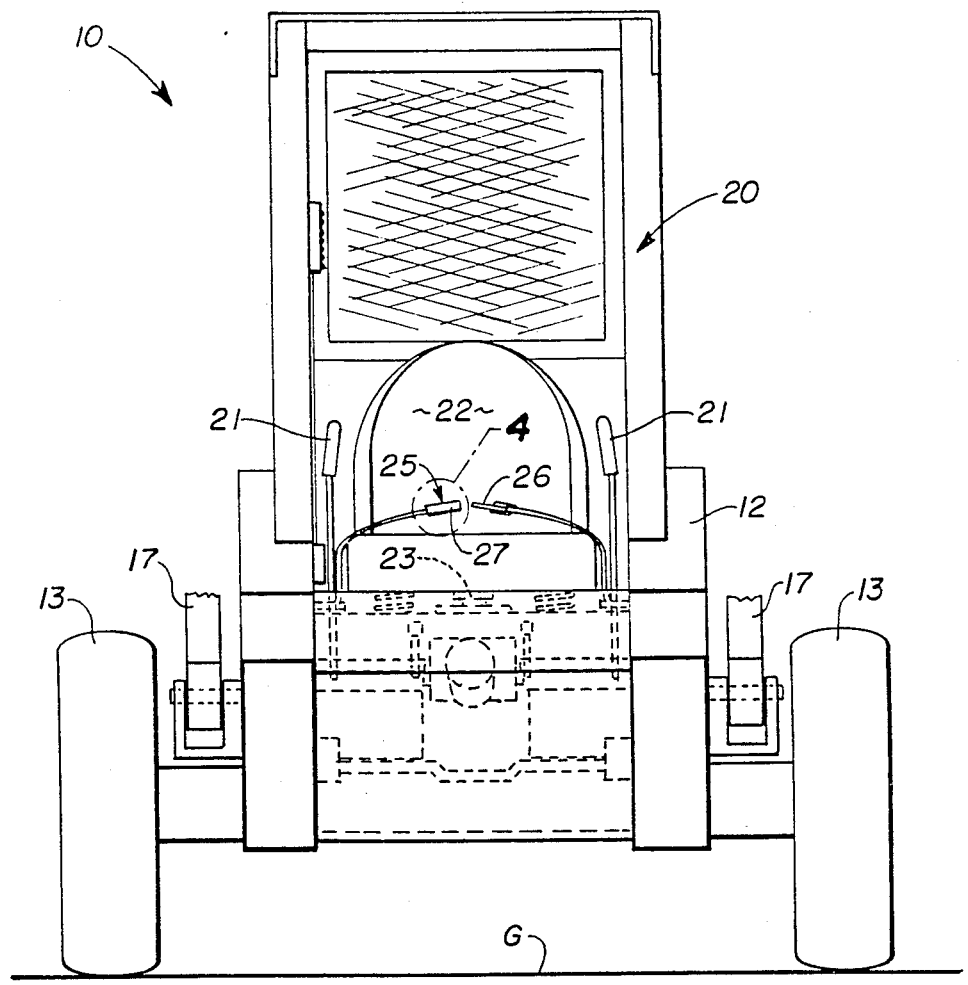
FIG. 1 is a front elevational view of a skid steer loader with the working tool being broken away to better show the operator seat and sensor, and incorporating the principals of the instant invention.
FIG. 2 is a diagramatic schematic view showing the interrelationship of FIGS. 2a, 2b, 2c, and 2d.
Figure 2A:
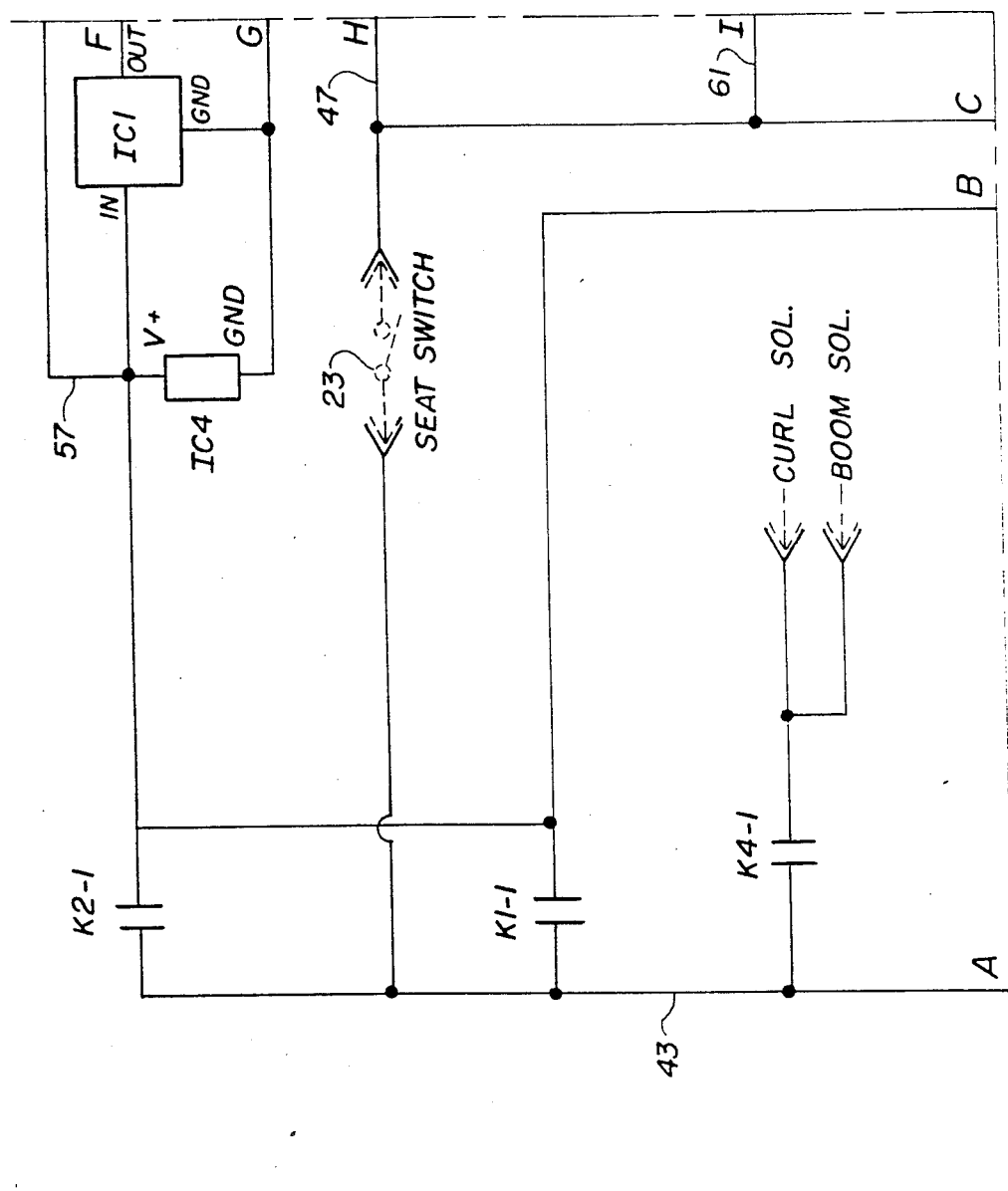
FIGS. 2a, 2b, 2c and 2d are schematic views showing the electrical circuit controlling the operation of the starter and hydraulic interlocks in conjunction with the actuation of the seat switch and seat belt switch.
Figure 2B:
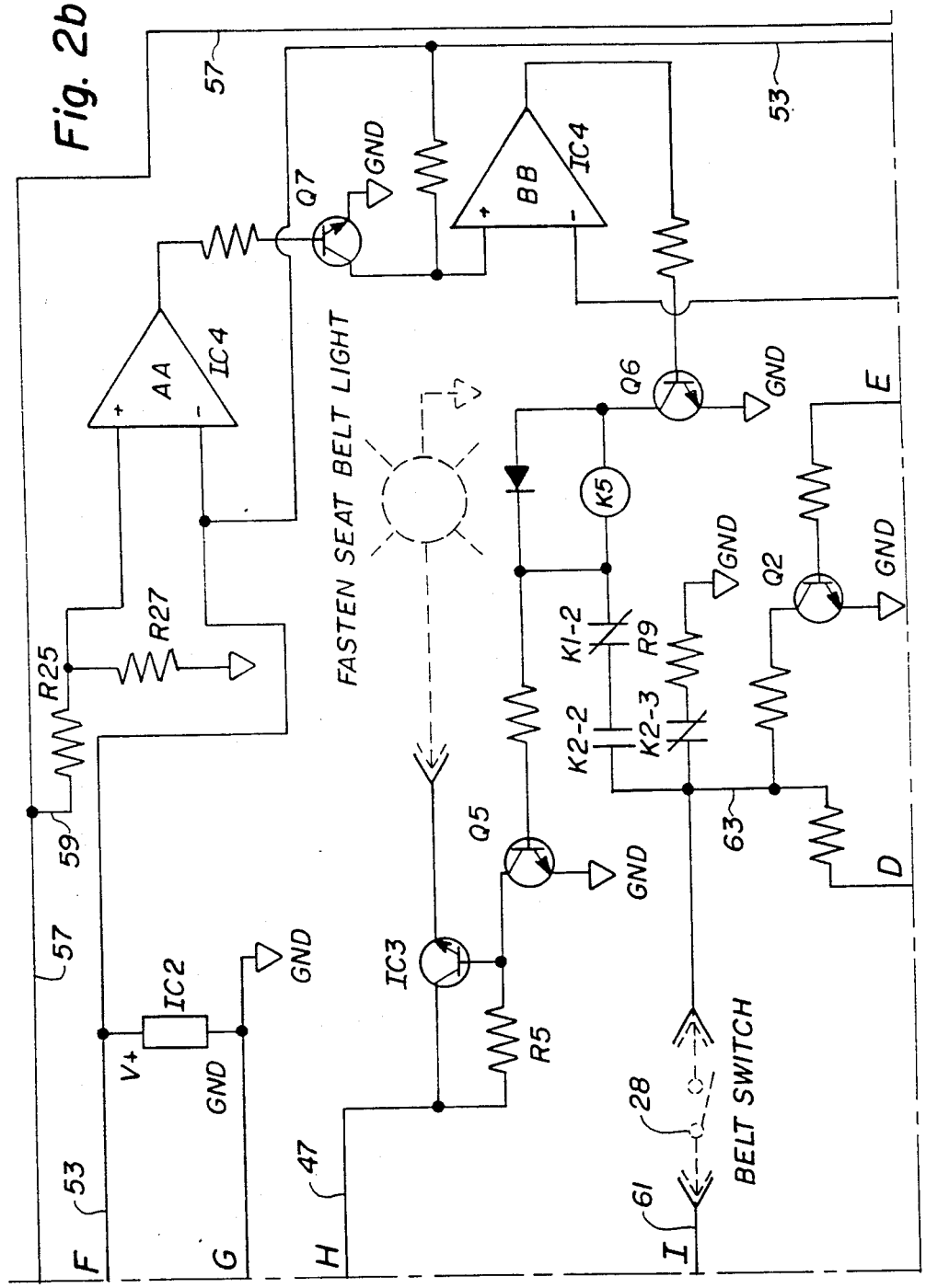
Figure 2C:
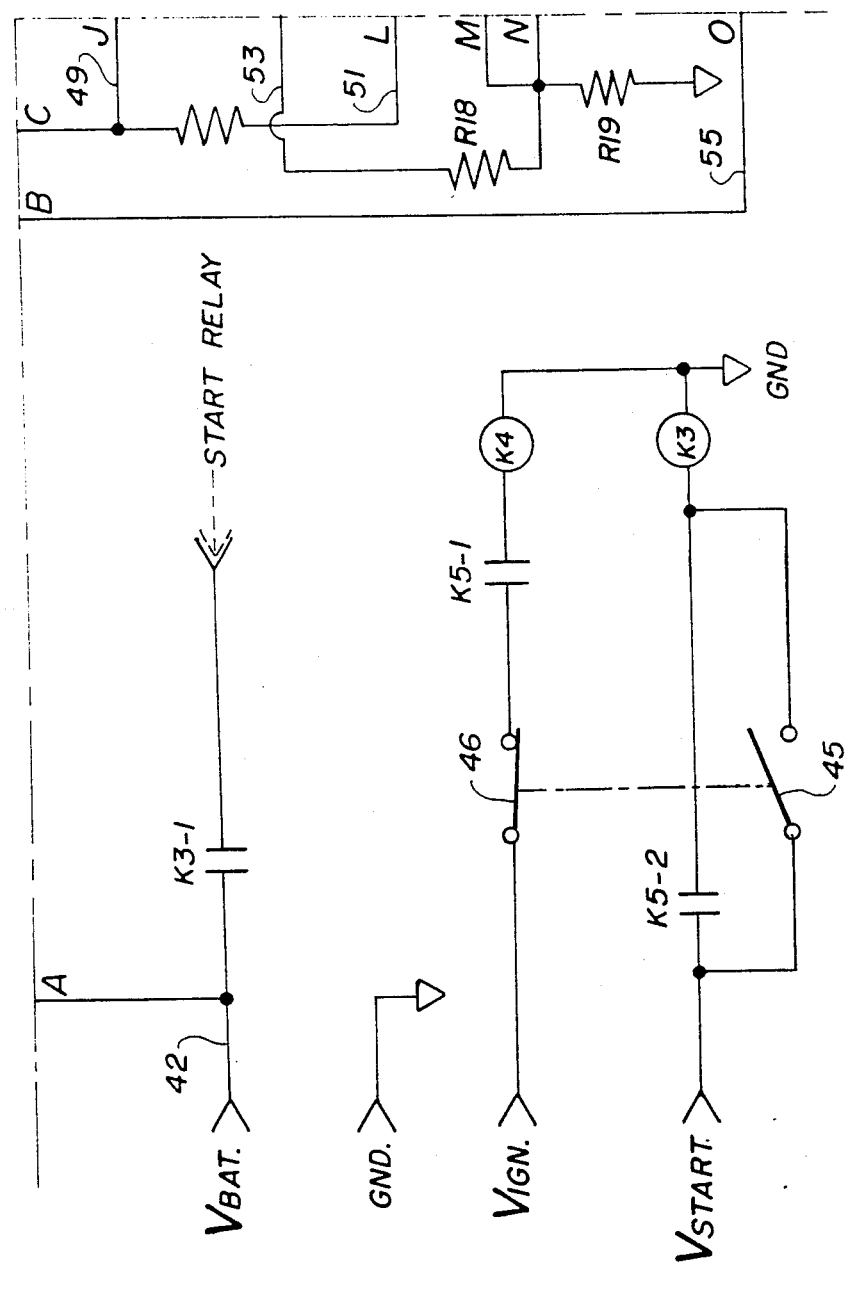
Figure 2D:
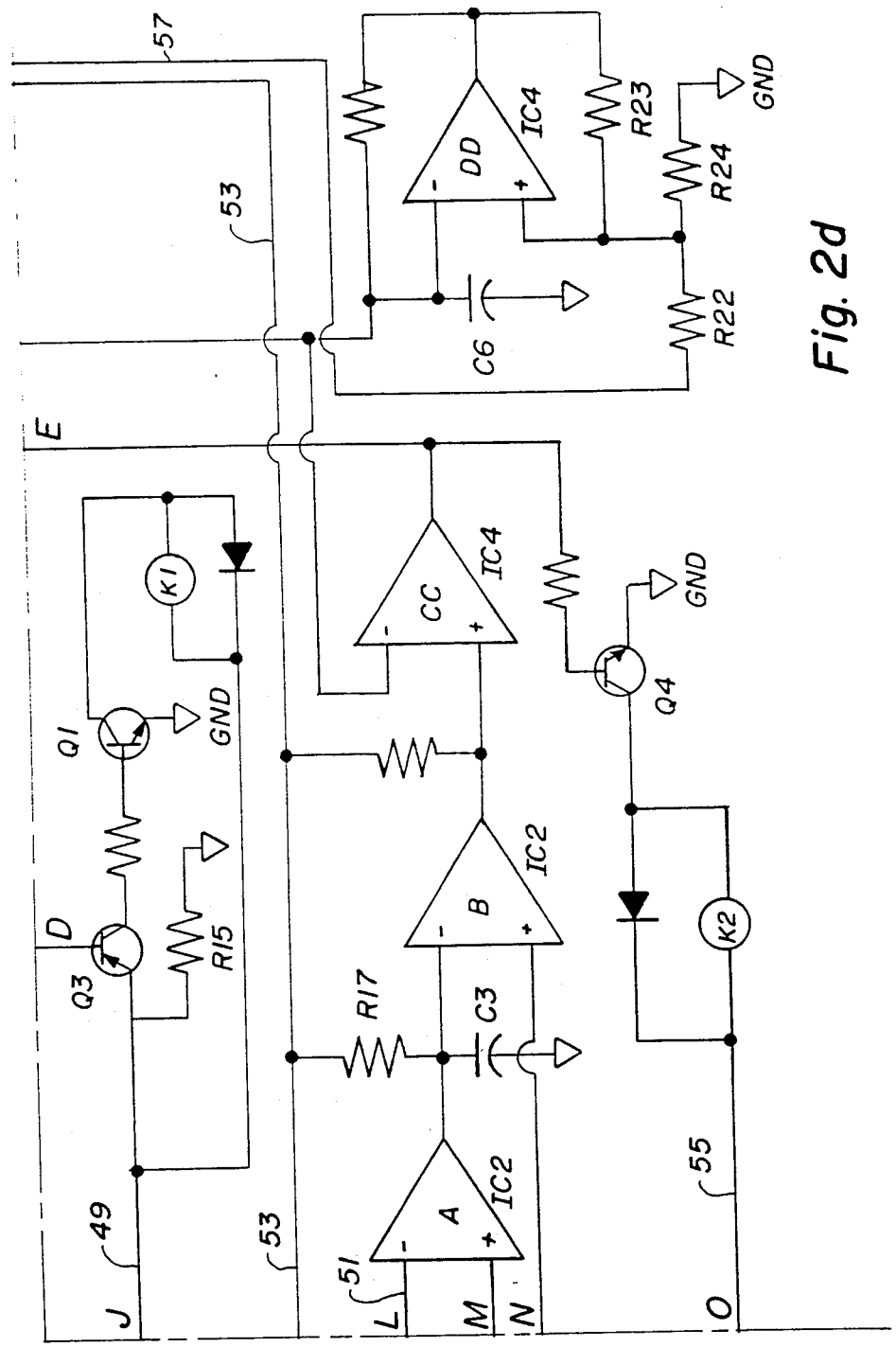
Figure 3:
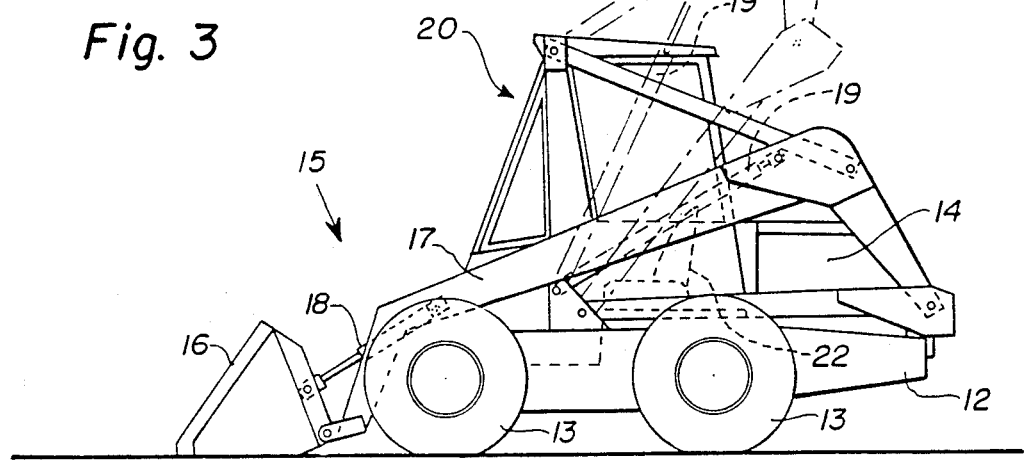
FIG. 3 is a side elevational view of the skid steer loader shown in FIG. 1 with the hydraulically actuated movement of the working tool apparatus being shown in phantom.

Referring now to the drawings, an industrial implement, commonly referred to as a skid steer loader, incorporating the principals of the instant invention can be seen. Any left and right references are used as a matter of convenience and are determined by standing at the rear of the machine facing the forward end at which is operably mounted a working tool. The drawings will be described in three distinct groupings, FIGS. 1 and 3–5 showing the mechanical structure of the implement, FIGS. 2 and 2a–d showing the electrical circuit of the controller, and FIGS. 6–18 depicting the logic of the controller operation.

IMPLEMENT STRUCTURE

Referring now to FIGS. 1 and 3–5, the mechanical structure of the skid steer loader can best be seen. The loader 10 is provided with a frame 12 having wheels 13 mounted thereon to mobilely support the loader 10 over the ground G. An engine 14 is mounted on the frame 12 and serves as the power plant for driving the loader 10 and the working tool assembly 15. Although the instant invention is not limited thereby, the means of propulsion is of conventional nature such as described in U.S. Pat. No. 3,810,517, issued to J. C. Hurlburt, et al on May 14, 1974. The engine 14 is also of a conventional nature and includes a conventional starter mechanism (not shown) connected to the electrical system of the loader 10, as will be described in greater detail below, to effect a starting of the engine 14.

The working tool assembly 15 is movably mounted on the frame 12 to perform a variety of working tasks typically associated with such implements. The working tool assembly 15 depicted in FIGS. 1 and 3 includes a bucket 16 pivotally mounted on a pair of transversely spaced boom arms 17 which are in turn pivotally connected to the frame 12. A pair of bucket hydraulic cylinders 18 interconnect the bucket 16 and respective boom arms 17 to provide a means for pivotally moving the bucket 16 relative to the boom arms 17. Similarly, a pair of boom hydraulic cylinders 19 interconnect the respective boom arms 17 and the frame 12 to provide pivotal movement of the boom arms 17 relative to the frame 12.

The frame 12 supports an operator compartment 20 forwardly of the engine 14 and immediately rearwardly of the bucket 16 to permit a view of the operation thereof. The operator compartment 20 is provided with an operator seat 22 from which the operator can control the movements of the loader 10 and the working tool assembly 15 by means of control levers 21 and/or pedal controls (not shown) in a conventional manner. The seat 22 is equipped with a seat switch 23 operable to sense the presence of the operator in the seat 22 in a manner described in detail in U.S. Pat. No. 4,385,863, issued to Ray C. Minor on May 31, 1983, the descriptive portions thereof are incorporated herein by reference.

Figure 4:
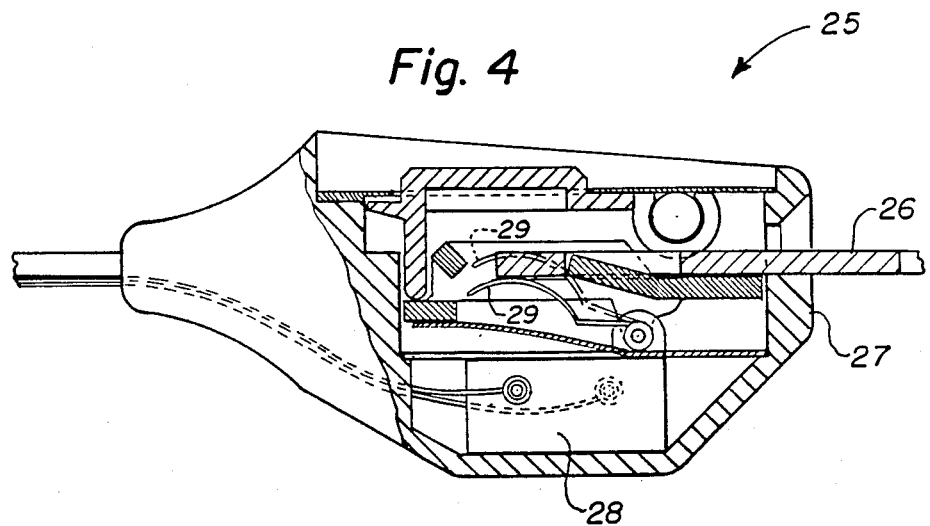
FIG. 4 is an enlarged detail view of the seat belt forming the operator restraint mechanism corresponding to the circle labeled 4 in FIG. 1 to show the location and actuation of the seat belt switch.

The operator compartment 20 is also provided with an operator restraint mechanism 25 in the form of a seat belt as can be seen in greater detail in FIG. 4. The female receptor portion 27 of the seat belt 25 is provided with a belt switch 28 having a contact lever 29 positioned for engagement with the male buckle portion 26 of the seat belt 25 such that connection of the male buckle portion 26 with the female receptor portion 27 actuates the belt switch 28 to sense the engagement of the operator restraint mechanism 25 in an operative position in which the seat belt 25 may be wrapped around the operator to restrain him in the seat 22. When the operator restraint mechanism 25 is in an inoperative position, i.e., disengaged, the belt switch 28 will be open to prevent the passage of current therethrough, which will be described in greater detail below.

Figure 5:
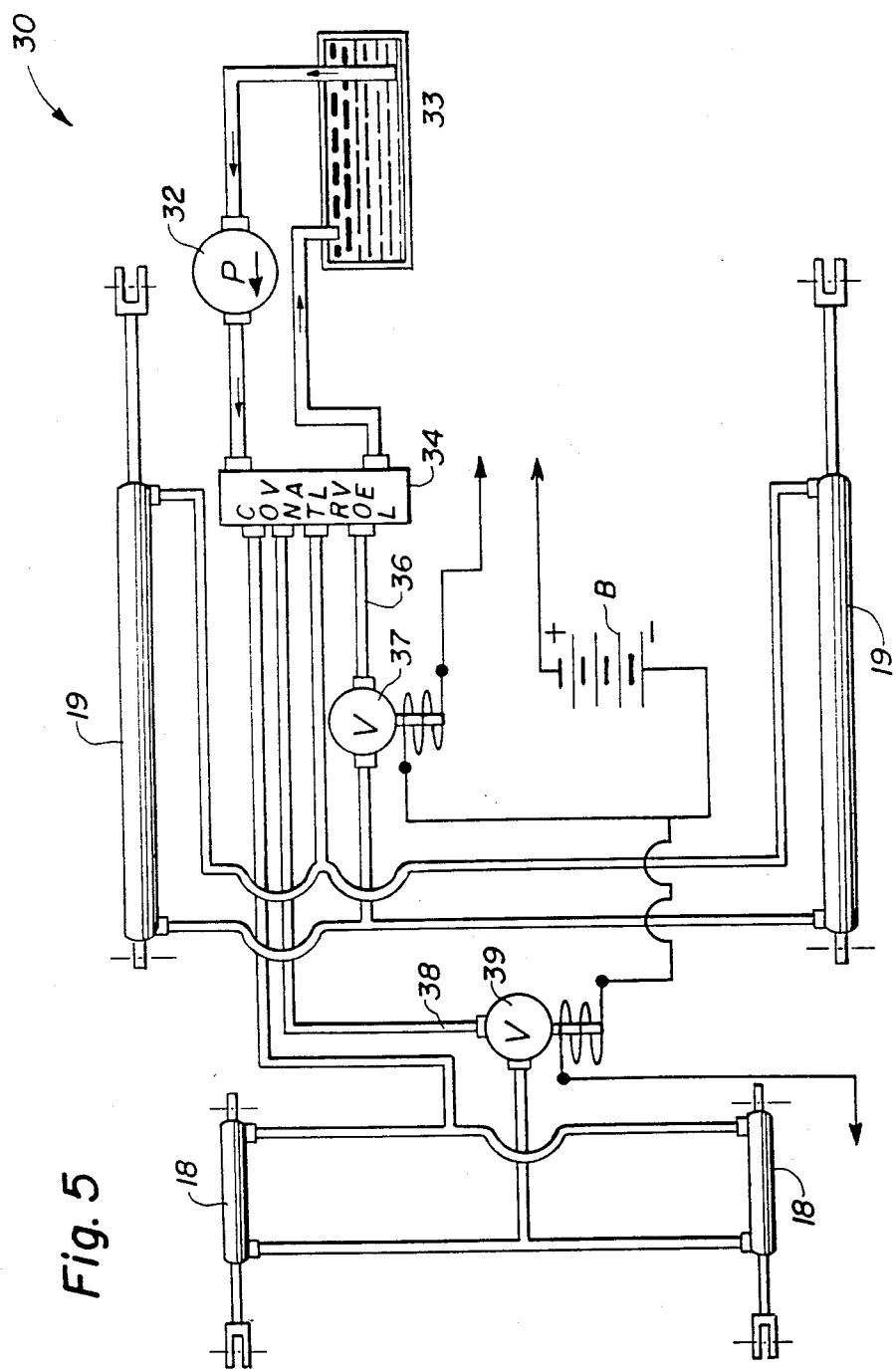

Referring now to FIG. 5, the hydraulic system 30 for powering the hydraulic actuators 18, 19 can best be seen. The hydraulic system 30 includes a pump 32 operably driven from the engine 14 to provide fluid under pressure from the reservoir 33 throughout the conduits 36, 38 interconnecting the pump 32 and the hydraulic actuators 18, 19, respectively. A conventional control valve 34 controls the direction of fluid from the pump 32 throughout the conduits 36, 38, thereby operably controlling the movement of the hydraulic cylinders 18, 19 and the operation of the working tool assembly 15. The conduit 36 interconnecting the control valve 34 and the boom hydraulic cylinders 19 is provided with a hydraulic solenoid valve 37 which is operable to block the flow of fluid through the conduit 36 and, thereby, disable the operation of the boom hydraulic cylinders 19. Similarly, the conduits 38 interconnecting the bucket hydraulic cylinders 18 and the control valve 34 are also provided with a hydraulic solenoid valve 39 operable to block the flow of fluid through the conduits 38 and disable the operation of the bucket hydraulic cylinders 18.

The solenoid valves 37, 39 are positioned so that an energizing thereof by the electrical system to which the solenoid valves 37, 39 are connected will enable the hydraulic system 30 and permit the working tool assembly 15 to be operated. Without being energized, the solenoid valves 37, 39 retain the hydraulic system 30 in a disabled condition, locking up the operation of the working tool assembly 15. One skilled in the art will readily realize that FIG. 5 includes a schematic representation of the electrical system with current coming from the battery B and the energizing control coming from the electrical system 40 forming the controller described in greater detail with respect to FIG. 2a below.

CONTROLLER ELECTRICAL CIRCUIT

Referring now to FIGS. 2 and 2a–d, the electrical circuit 40 forming the controller of the boom solenoid valve 37, the bucket solenoid valve 39 and the starter relay for the engine 14 can best be seen. Under initial conditions, the voltage from the battery $V_{BAT}$ is supplied through terminal connection 42 and through line 43 to relay contacts K2-1, K1-1, K4-1, K3-1 and to the open seat switch 23. Since neither the open seat switch nor the relay contacts draw any load from the battery B, the controller 40 will stay in this inactive state without weakening the battery B. At the initial conditions with the engine 14 off, the seat switch 23 and belt switch 28 are open, the service override switch 45 is open drawing the interconnected normal operation switch 46 into its closed position, all the relay coils K1, K2, K3, K4 and K5 are off and relay contacts K1-1, K2-1, K3-1, K4-1, K5-1, K2-2, and K5-2 are open, while relay contacts K1-2 and K2-3 are normally closed.

To awaken the controller 40, the operator sits in the seat 22, closing the seat switch 23 which provides voltage via line 47 to the collector of Ultra-Reliable transistor IC3 and through resistor R5 to the base of IC3. Since the NPN transistor Q5 is off, by reason of no current path to its base, the voltage on the base of transistor IC3 turns it on to illuminate the fasten seat belt light. Voltage is also applied by line 49 to the relay coil K1 and to the emitter of PNP transistor Q3. With the seat belt switch 28 open, the base of transistor Q3 is pulled down by resistor R9 through relay contacts K2-3, turning transistor Q3 on and, thereby, supplying current to the base of NPN transistor Q1 and turning on transistor Q1 to energize relay coil K1. Voltage is also supplied via line 51 to the negative input terminal of comparator A.

Energizing relay coil K1 closes relay contacts K1-1 and opens contact K1-2. The opening of contacts K1-2 prevents voltage from reaching relay coil K5 and thereby prevents relay coils K3 and K4 from being energized. The closing of relay contacts K1-1 supplies voltage to the power terminal of IC4 enabling comparators AA, BB, and CC and enabling oscillator amplifier DD. In addition, the closing of contacts K1-1 supplies voltage to the input of the voltage regulator IC1 which provides five volts to the power terminal of IC2 enabling comparators A and B. The five volts from the voltage regulator IC1 is also applied to a divider formed by resistors R18 and R19 via line 53 to make a 2.5 volt reference. The closing of relay contacts K1-1 also supplies voltage via line 55 to relay coil K2 and via lines 57, 59 to the divider formed by resistors R25 and R27.

The divider formed by resistors R25 and R27, and comparators AA and BB provide the function of a voltage monitor. Resistors R25 and R27 are sized to provide greater than five volts to the positive terminal of comparator AA whenever the voltage in line 57 is greater than 17 volts. Whenever the voltage of the positive terminal of the comparator AA is greater than 5 volts which is supplied to the negative terminal of comparator AA, the comparator AA outputs source current into the base of transistor Q7 which turns on, pulling the positive input terminal of comparator BB to ground, which in effect turns comparator BB off and pulls the base of transistor Q6 to ground, preventing transistor Q6 from being turned on. With transistor Q6 turned off, relay coil K5 is prevented from being energizing which in turn prevents relay coils K3 and K4 from being energized.

Under normal circumstances, the voltage from the divider formed by resistors R25 and R27 is less than five volts. The comparator AA output then pulls the base of transistor Q7 to ground, preventing transistor Q7 from turning on. This allows the five volts on line 53 to be applied to the positive terminal of comparator BB which in turn outputs source current to the base of transistor Q6 to permit relay coil K5 to energize by the current applied thereto.

Closing relay contacts K1-1 also supplies voltage via a line 57 to the divider formed by resistors R22 and R24. The voltage from this divider and the voltage fed back by resistor R23 determined the trip threshold of oscillator amplifier DD. As the voltage applied to the divider formed by resistors R22 and R24 increases, the amplitude of the signal at capacitor C6 also increases. The output of the amplifier DD is high when the charge on the capacitor C6 is lower than the voltage on the positive input of the amplifier DD. The capacitor C6 is then charged through resistor R21 until the voltage on it exceeds the voltage on the positive input of amplifier DD. The output of amplifier DD then goes low and discharges capacitor C6 until the voltage on it goes below the positive input on the amplifier DD. The resistor R23 causes voltage on the positive input of amplifier DD to be higher when the output of amplifier is high and lower when the output of amplifier DD is low. This feature provides the changes to the positive input of amplifier DD required for the oscillator to oscillate and also determines the magnitude of the charge on the capacitor C6.

When five volts is applied to the positive input of comparator BB, the time that the signal at capacitor C6 is greater than five volts will cause the output of comparator BB to pull the base of transistor Q6 to ground, turning transistor Q6 off. The time that the signal at capacitor C6 is less than five volts will cause the output of comparator BB to apply current to the base of transistor Q6, turning transistor Q6 on. The ratio of time on to time off controls the current that can flow through relay coil K5. This current control permits operating relay control relay K5 over a wider voltage range without burnout caused by excessive current or lowered pull-in/hold-on force caused by too little current.

Comparator CC performs the same function for transistor Q4 and relay coil K2 and for transistors Q2, Q3 and Q1 and relay coil K1. When relay contacts K1-1 close, the 2.5 volt reference is compared to the voltage at the negative input of comparator A. If the voltage on the negative input is greater than 2.5 volts, the output of comparator A turns on, shunting compacitor C3 and pulling the negative input of comparator B to ground. If the negative input of comparator B is lower than 2.5 volts, then the output of comparator B turns off allowing five volts to be applied to the positive input of comparator CC. With five volts supplied to the positive input of comparator CC, relay coil K2 is energized, closing relay contacts K2-1, K2-2 and opening relay contacts K2-3. The opening of relay contacts K2-3 removes resistor R9 from the base of transistor Q3, which turns control of the current through relay coil K1 over to transistors Q1, Q3 and Q2 and to comparator CC as explained above.

The closing of the seat switch 23 provides current to the belt switch 28 via line 61. The closing of the seat belt switch 28 supplies voltage to the base of transistor Q3, which overrides the control from transistor Q2 and forces transistor Q3 to turn off, preventing current from reaching the base of transistor Q1. With transistor Q1 turned off, relay coil K1 is deenergized, causing relay contacts K1-1 to open, but since relay coil K2 is energized, relay contacts K2-1 provides voltage in the same manner as described above for relay contacts K1-1. The energizing relay coil K1 also causes contacts K1-2 to close. Current is then supplied through the closed contacts K2-2 and K1-2 to the base of transistor Q5 turning transistor Q5 on and pulling the base of transistor IC3 to ground, which turns off the transistor IC3 and the fasten seat belt light.

Voltage is also supplied through relay contacts K2-2 and K1-2 to the relay coil K5 and, if the voltage applied to the comparator AA as described above permits, transistor Q6 will permit relay coil K5 to energize. The energizing of relay coil K5 closes relay contacts K5-1 and K5-2. The closed relay contacts K5-2 allows the voltage from the starter switch $V_{START}$ to energize relay coil K3, which in turn closes relay contacts K3-1 and allows the battery voltage $V_{BAT}$ to be applied to the starter relay and permit the starting of the engine 14. Closed relay contacts K5-1 allows the voltage from the ignition switch $V_{IGN}$ to energize relay coil K4, closing relay contacts K4-1 which in turn allows the battery voltage $V_{BAT}$ to be applied to the boom solenoid valve 37 and the bucket solenoid valve 39, enabling their operation.

If the voltage applied to the negative input of comparator AA increases above five volts, the current to the base of transistor Q6 will cease causing relay coil K5 to be deenergized, opening relay contacts K5-1 and K5-2. The opening of relay contacts K5-1 will deenergize the relay coil K4, causing relay contacts K4-1 to open and interrupt voltage to the hydraulic solenoid valves 37, 39 and disabling their operation. Opening relay contacts K5-2 will deenergize the relay coil K3, causing relay contacts K3-1 to open; however, while this will prevent a restarting of engine 14, the closing of contacts of K3-1 will not turn the engine 14 off if it is already running.

If the belt switch 28 is opened, control of transistor Q3 will be returned to transistor Q2 and comparator CC, which if the seat switch 23 is still closed, turns on transistor Q1 as described above, energizing relay coil K1, causing relay contacts K1-2 to open, which in turn removes voltage from relay coil K5, opens relay contacts K5-1 and K5-2, and causes the results as described above. Since the opening of the seat belt switch 28 will also turn off transistor Q5, transistor IC3 is permitted to turn on and illuminate the fasten seat belt light. A reclosing of the seat belt switch 28 performs the same functions as the initial closing of the seat belt switch 28 as described above.

The opening of the seat switch 23 removes voltage from the negative input of comparator A, allowing resistor R15 to pull the negative input of comparator A low, turning the output of comparator A off. With the output of comparator A off, the capacitor C3 is permitted to charge through resistor R17 toward the five volts carried by line 53. When the voltage on capacitor C3 reaches 2.5 volts, the output of comparator B will turn on, pulling the positive input of comparator CC to ground, which turns the output of comparator CC on to pull the bases of transistors Q4 and Q2 to ground, and turns transistors Q4 and Q2 off to deenergize relay coils K1 and K2. This situation will return the circuit to the initial conditions of power off described above. If, however, the seat switch 23 is reclosed before the voltage on the capacitor C3 reaches 2.5 volts, the output comparator A will be turned on removing the charge from C3 and permit resumption of the normal operation as described above. The charging of capacitor C3 upon the opening of the seat switch 23 provides a delay for a period of time equal to approximately three seconds for the seat switch 23 to be reclosed without requiring a resequencing of the closing of the seat switch 23 and the seat belt switch 28.

If the seat belt switch 28 is closed before the seat switch 23 is closed, the current supplied into line 63 will prevent transistor Q3 from turning on, by reason of a lack of voltage differential between the base and the emitter of transistor Q3, preventing transistor Q1 from being turned on and energizing relay coil K1. Since relay contacts K1-1 and K2-1 remain open, current will not be supplied along line 55 and line 53 to effect an energizing of relay coil K2, keeping relay contacts K2-1 and K2-2 open and preventing relay coil K5 from being energized. As a result, relay contact K5-1 and K5-2 would remain open to prevent relay coils K3 and K4 from being energized, thereby disabling the hydraulic solenoid valves 37, 39 and the starter relay.

The controller 40 can be placed into a service mode by moving the service switch 45 into a closed position which, because of the interconnection between service switch 45 and the normal operation switch 46, moves the normal operation switch 46 into an open position. With the service switch 45 closed, the voltage from the starter $V_{START}$ will bypass the relay contacts K5-2 and energize the relay coil K3 allowing the voltage from the battery $V_{BAT}$ to be supplied to the starter relay over the closed relay contacts K3-1 and permit the engine 14 to be started. The open normal operation switch 46 will prevent the relay coil K4 from being energized, keeping relay contacts K4 open and preventing the voltage from the battery $V_{BAT}$ from being supplied to the hydraulic solenoids 37, 39 through the relay contacts K4-1.

LOGIC OPERATION

Figure 6:
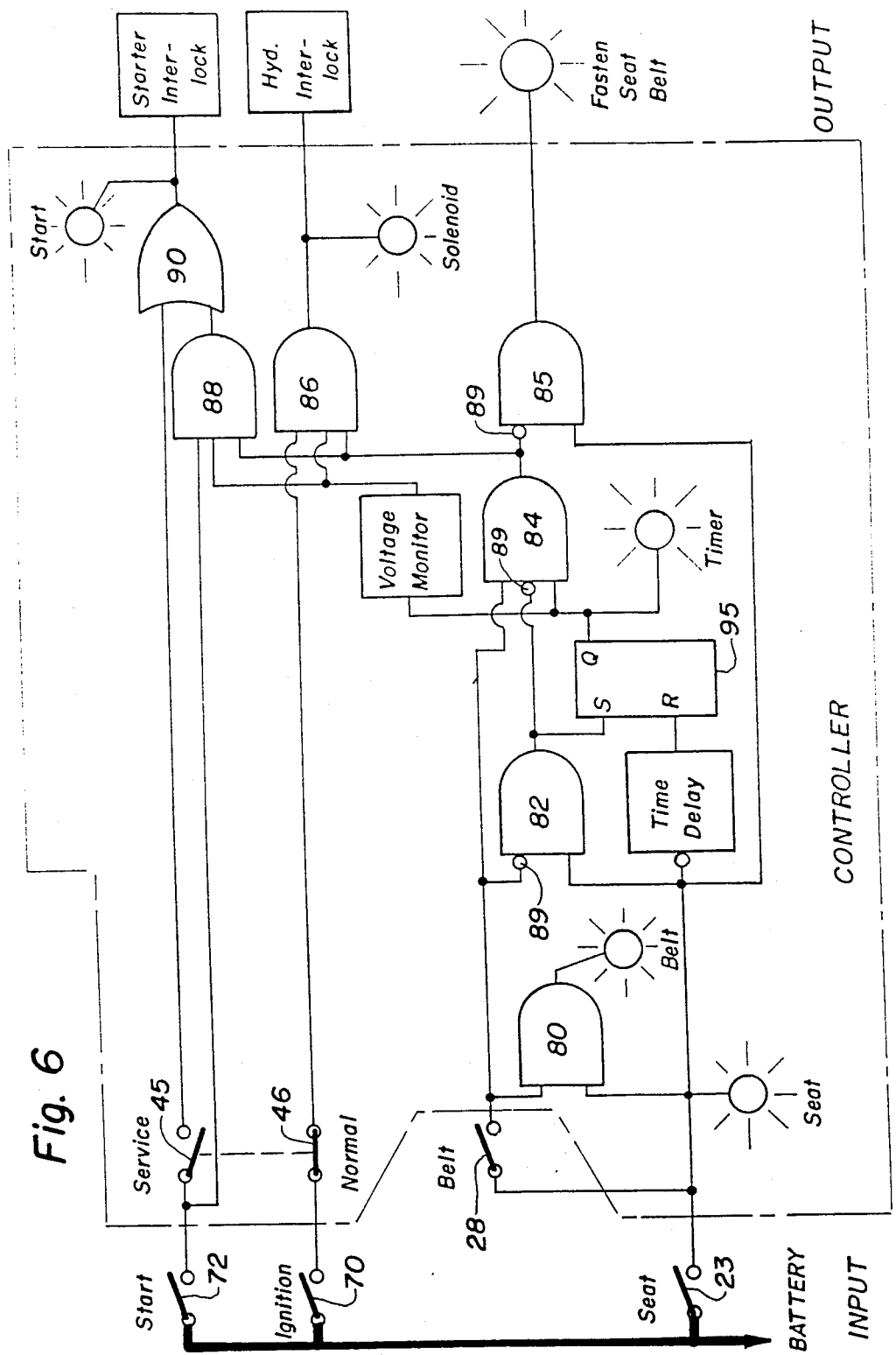
FIGS. 6–18 are schematic logic diagrams showing the operation of the controller for the starter and hydraulic interlocks operating in conjunction with various combinations of switch actuations, the use of the heavy line along the logic circuit indicating the path of the generated signal.

Referring now to FIGS. 6–18, the logic operation of the controller 40 can best be seen. The use of heavy lines in the logic diagrams in FIGS. 6–18 indicates signal path. FIG. 6 depicts the initial state with current from the battery being supplied to the seat switch 23, the ignition switch 70, and the starter switch 72. The normal operation switch 46 is in a closed position forcing the interconnected service override switch 45 into an open position. The seat belt switch 28 is also open. The logic diagram includes six ANDGATES 80, 82, 84, 85, 86 and 88, and one OGATE 90, and a Set/Reset Latch 95, the operation which will be described in greater detail below. The controller is also provided with diagnostic lights indicating the operation of the seat switch, belt switch and timer, as well as diagnostic lights indicating operation of the hydraulic solenoid interlocks and the starter relay interlock. A signal inverter 89 is provided on three of the terminals on ANDGATES 82, 84, and 85. The external output to be affected by the controller includes the starter relay interlock, the hydraulic interlocks in the form of the solenoid valves 37, 39, and a fasten seat belt light which tells the operator that he must fasten or refasten the seat belt to enable the operation of the loader 10.

Figure 7:
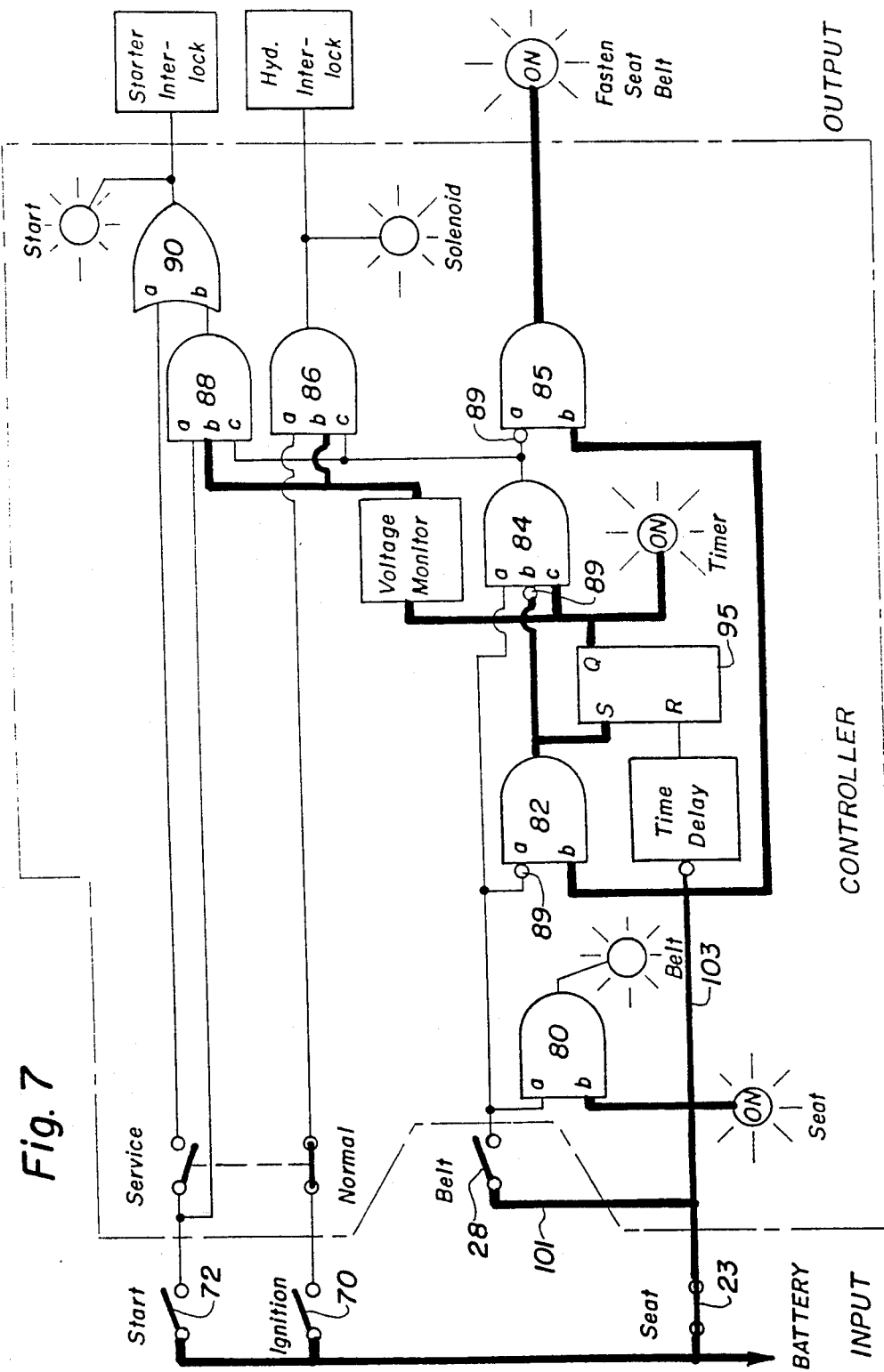

FIG. 7 depicts the manner in which the controller is awakened. The operator sits in the seat, closing the seat switch 23, to provide a signal along lead 101 to the open belt switch 28 and along lead 103 to provide a signal to the b terminal of ANDGATE 80, a signal to the b terminal of ANDGATE 82, and a signal to the b terminal of ANDGATE 85. The closing of the seat switch 23 also illuminates the diagnostic seat light and sets the time delay. Since ANDGATE 80 reads only one signal at its two terminals, the belt diagnostic light remains unlit. Because of the signal inverter 89, the ANDGATE 82 reads a signal at both the a and b terminals and outputs a signal to the b terminal of ANDGATE 84 and to the set terminal S of the Set/Reset Latch 95.

The activation of the Set/Reset Latch 95 effects the output of a signal from the Q terminal to illuminate the timer light, provide a signal to the c terminal of ANDGATE 84, provide a signal through the voltage monitor to the b terminal of ANDGATE 88 and the b terminal of ANDGATE 86. Since the ANDGATE 84 is reading no signal at its a and b terminals (due to the signal inverter 89), ANDGATE 84 has no output. Likewise, the lack of signal at the a and c terminals at ANDGATE 86 and 88 prevents any output therefrom. Because of the signal inverter 89 at the a terminal of the ANDGATE 85, a signal is recognized at both the a and b terminal of ANDGATE 85, resulting in an output to illuminate the fasten seat belt light externally of the controller. As a result, the operator is being informed that he must fasten his seat belt to enable operation of the loader.

Figure 8:
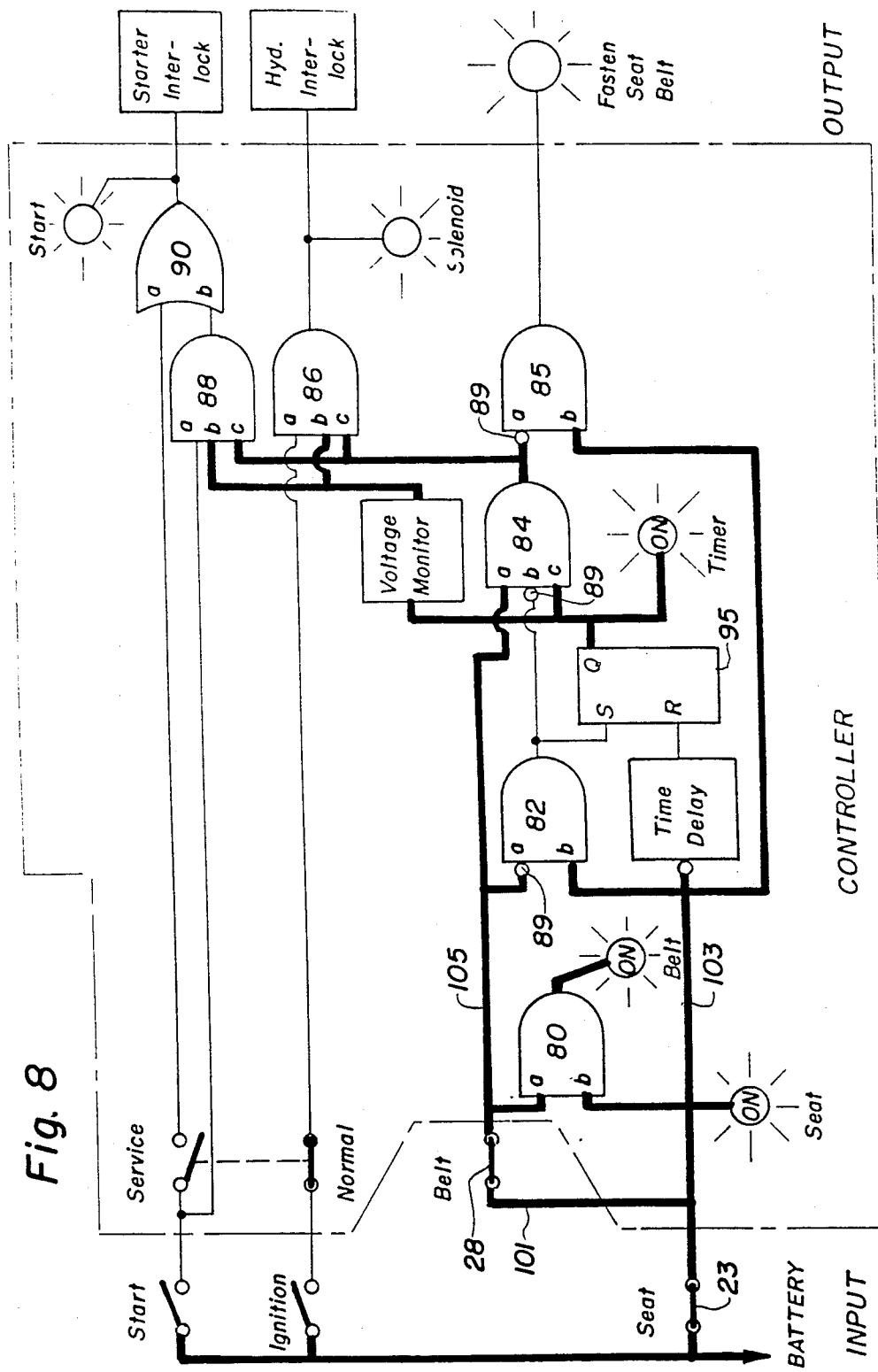

The next sequential step is reflected in FIG. 8. After sitting in the seat, closing the seat switch 23 as reflected in FIG. 7, the operator fastens his seat belt, closing the belt switch 28. The signal crosses the closed belt switch 28 from lead 101 to lead 105 to provide a signal to the a terminal of ANDGATE 80, the a terminal of AND-GATE 82, and the a terminal of ANDGATE 84. Since ANDGATE 80 now receives a signal at both the a and b terminals, the output signal illuminates the diagnostic belt light. The receipt of a signal at the a terminal of ANDGATE 82 is inverted by the signal inverter 89, resulting in a cancellation of the output signal from ANDGATE 82.

Since the Set/Reset Latch 95 has been turned on by the closing of the seat switch 23, the signal continues from the Q terminal to illuminate the timer diagnostic light and to provide a signal at the c terminal of AND-GATE 84 and the b terminals of ANDGATES 86 and 88. Because of the signal inverter 89 at the b terminal, ANDGATE 84 reads a signal at all three terminals and outputs a signal to the a terminal of ANDGATE 85 and the c terminals of ANDGATE 86 and 88. The signal inverter 89 at the a terminal of ANDGATE 85 effects a cancellation of the output of ANDGATE 85 to turn off the fasten seat belt light externally of the controller. Since ANDGATES 86 and 88 still do not receive signals at the respective a terminals, ANDGATES 86 and 88 have no output signal.

Figure 9:
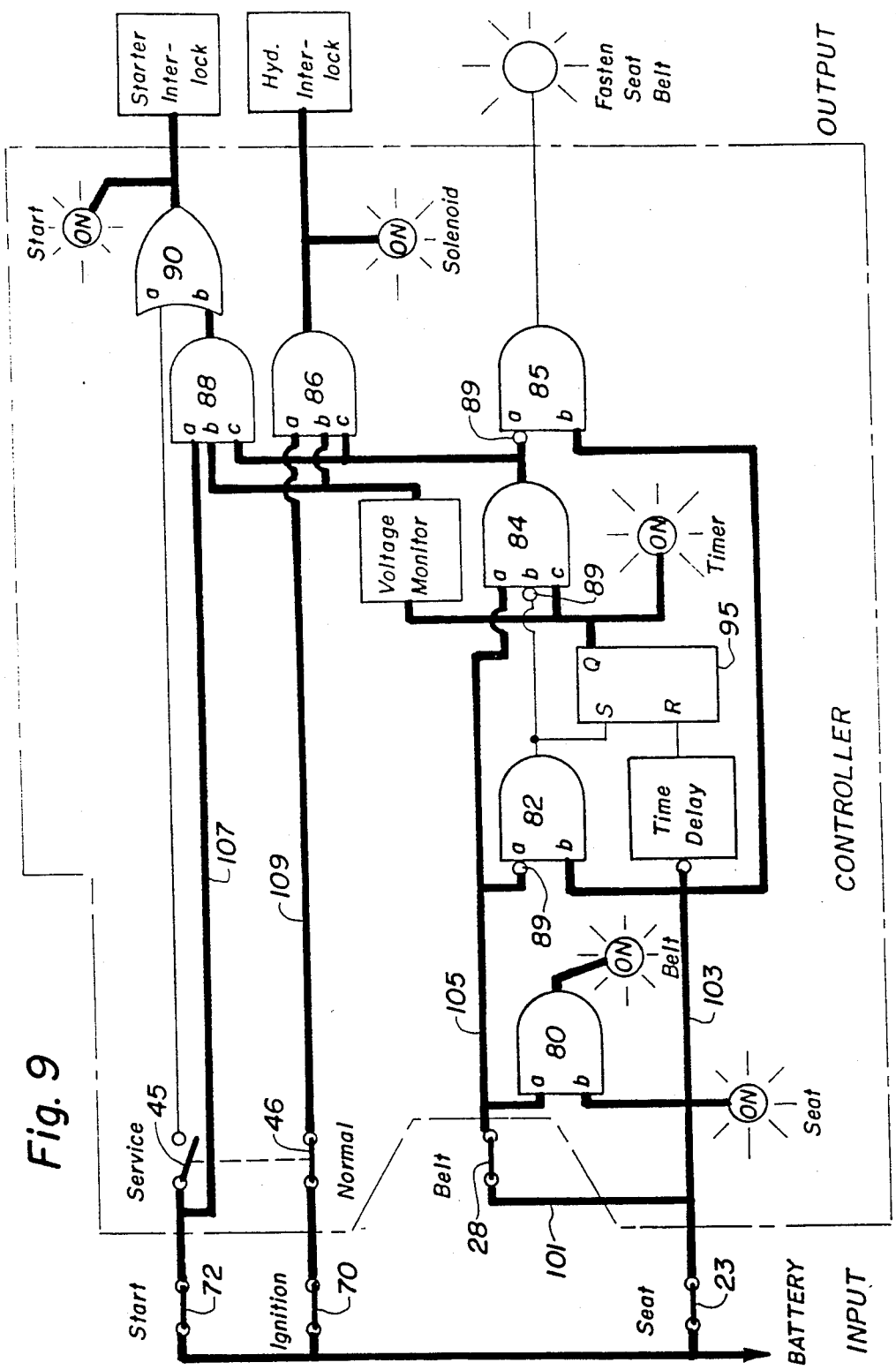

After the proper sequencing of the closing of the seat switch 23 and the belt switch 28 as reflected in FIGS. 7 and 8, the operator can enable operation of the loader 10 by closing the ignition and starter switches 70, 72 as reflected in FIG. 9. The signal from the closed ignition switch 70 passes through the closed normal operation switch 46 and enters the a terminal of ANDGATE 86. Since ANDGATE 86 now reads a signal at all three of its input terminals, the output signal illuminates the solenoid diagnostic light and activates the hydraulic interlock in the form of energizing the solenoid valves 37, 39 to enable operation of the loader hydraulic system 30 as described above. The signal from the closed starter switch 72 bypasses the open service override switch via lead 107 to provide a signal at the a terminal of ANDGATE 88. Since all three input terminals of ANDGATE 88 have a signal provided thereto, the output signal from ANDGATE 88 goes to the b terminal of ORGATE 90, activating the output signal to illuminate the starter diagnostic light and energize the starter relay interlock which in turn permits the starting of the engine 14.

Figure 10:
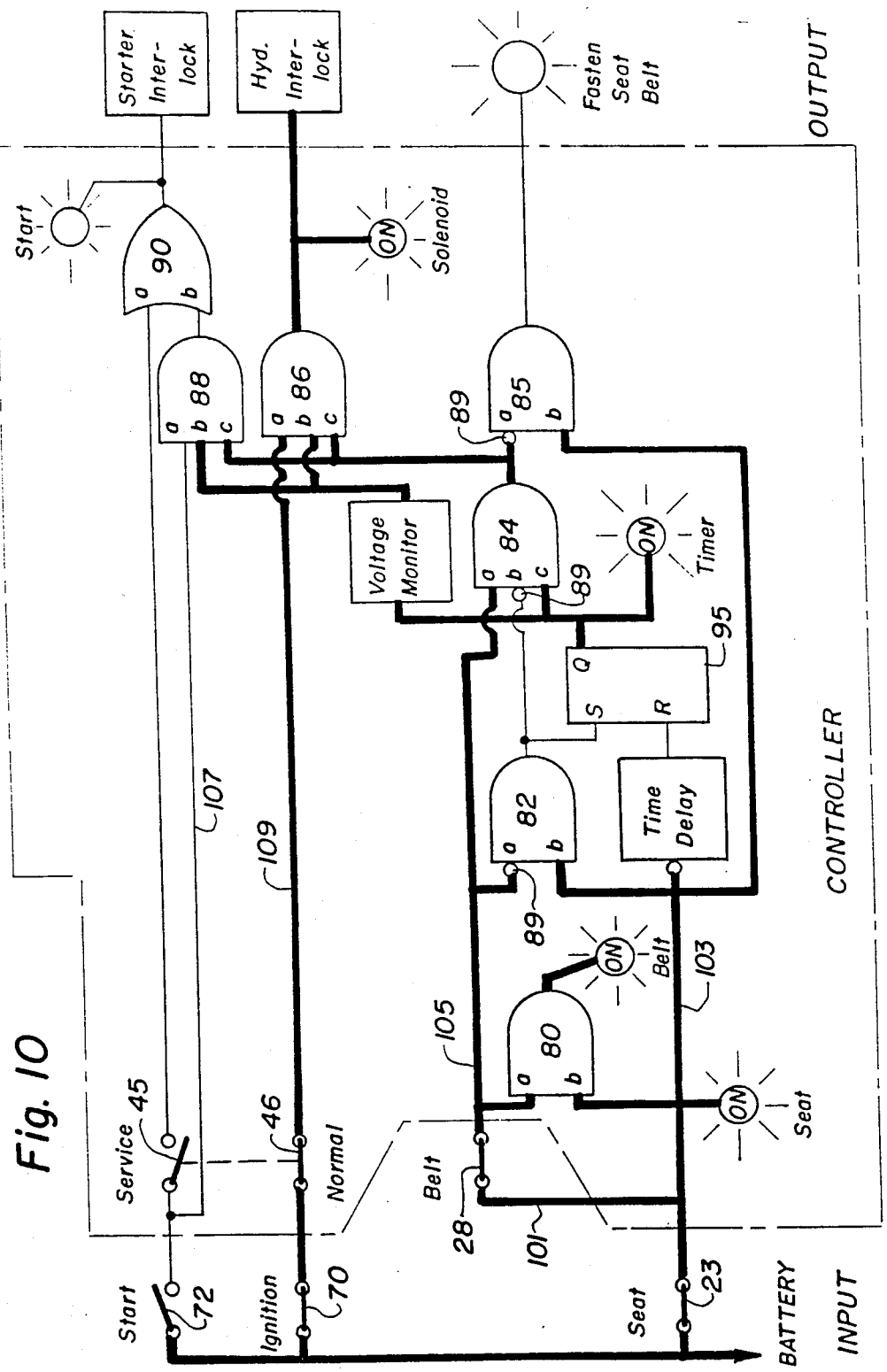

Once the engine 14 has been started and the starter switch 72 opened, as reflected in FIG. 10, the closed ignition switch 70 continues the activation of AND-GATE 86 to energize the hydraulic interlock and permit the continued operation of the loader 10 with the engine 14 running. It should be clear from reference to FIGS. 9 and 10 that the mere stopping of the engine 14 without changing the condition of the switches 23, 28, 70 and 46 will not affect the logic operation of the controller. A mere closing of the starting switch 72 will provide a reenergizing of the starter interlock to permit a restarting of the engine 14. FIG. 10 reflects logic operation of the controller corresponding to the normal operative mode of the loader 10.

Figure 11:
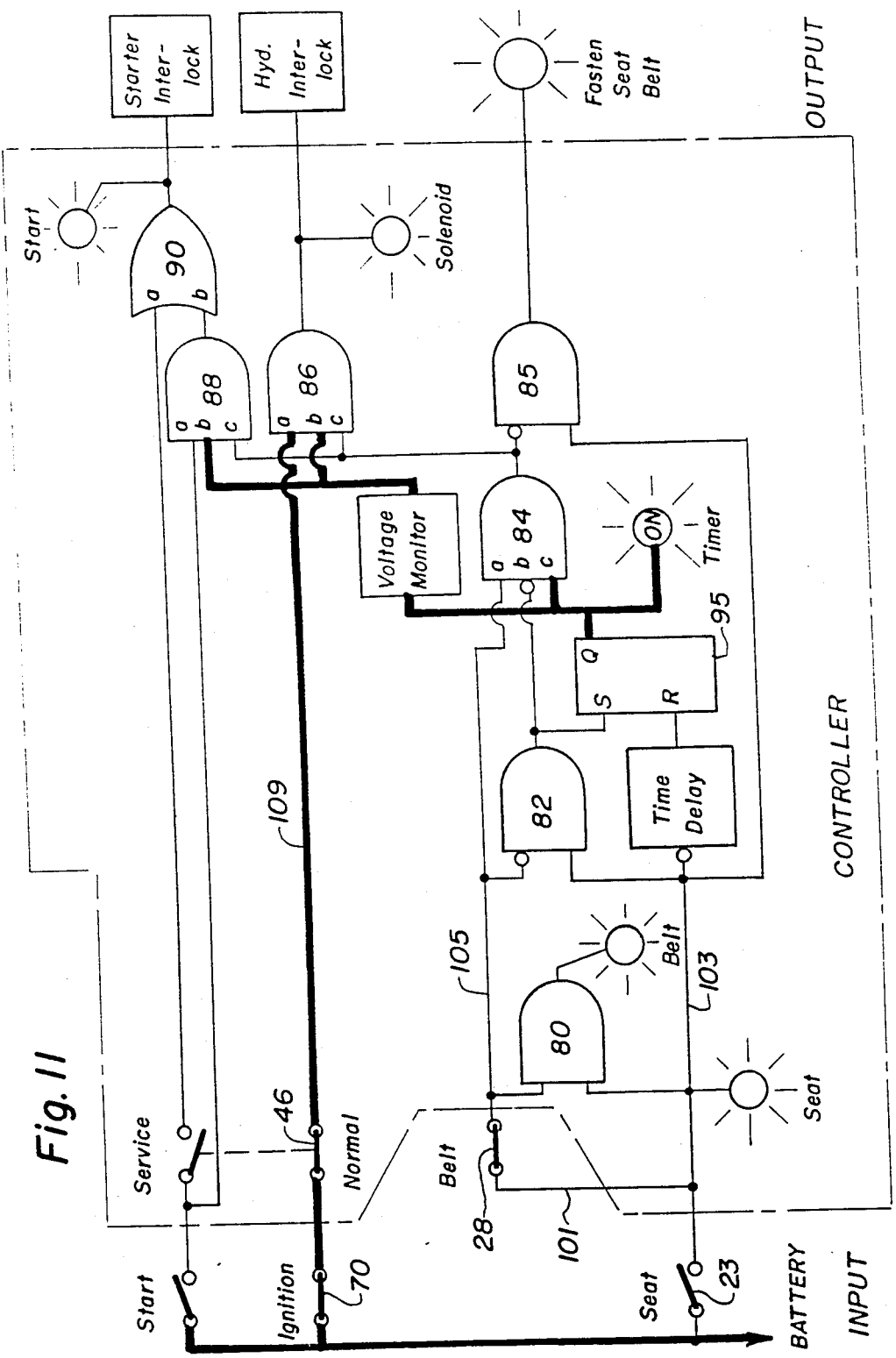

Under some rough operating conditions, the operator could conceivably be bouncing somewhat in his seat, opening and closing the seat switch 23 repeatedly. This condition is reflected in FIGS. 11 and 12. FIG. 11 depicts the logic operation when the operator is bounced up in the seat, opening the seat switch 23. The opening of seat switch 23 terminates the signal along leads 101, 103 and 105, directly shuting off ANDGATES 80, 82, 84 and 85. So long as the seat switch 23 has remained open for less than 3 seconds, the time delay will not have actuated, leaving the Set/Reset Latch outputting a signal from its Q terminal to illuminate the timer diagnostic light and provide a signal from a voltage monitor to the b terminals of ANDGATES 86 and 88. Since the lack of signal from lead 105 to the a terminal of AND-GATE 84 prevents the output of signal to the c terminal of ANDGATE 86, the output of ANDGATE 86 has been turned off, deenergizing the hydraulic interlock to prevent operation of the loader hydraulic system 30. It can be seen that the result of opening the seat switch 23 is a locking up of the loader hydraulics and a disabling of the boom and bucket.

Figure 12:
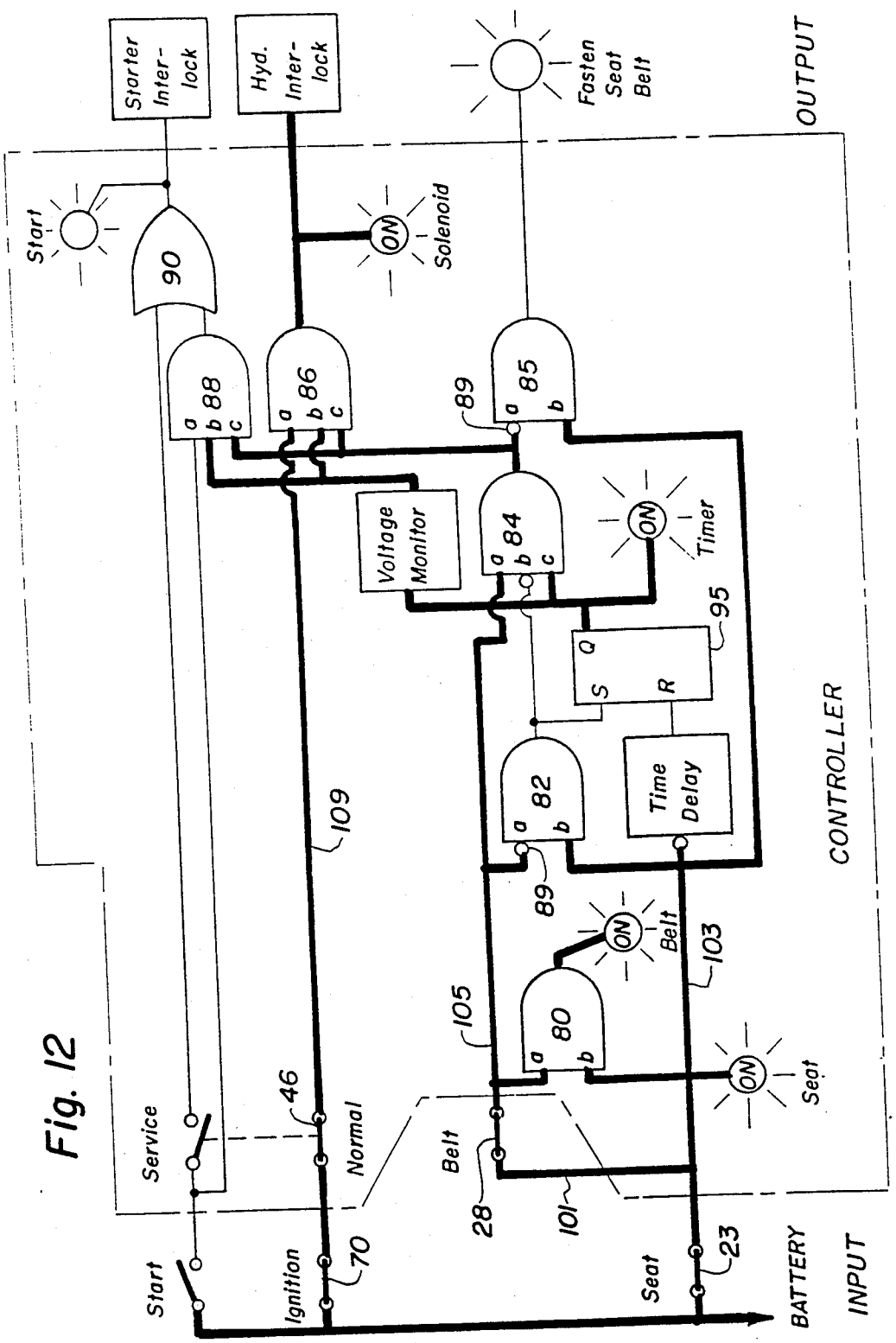
Figure 13:
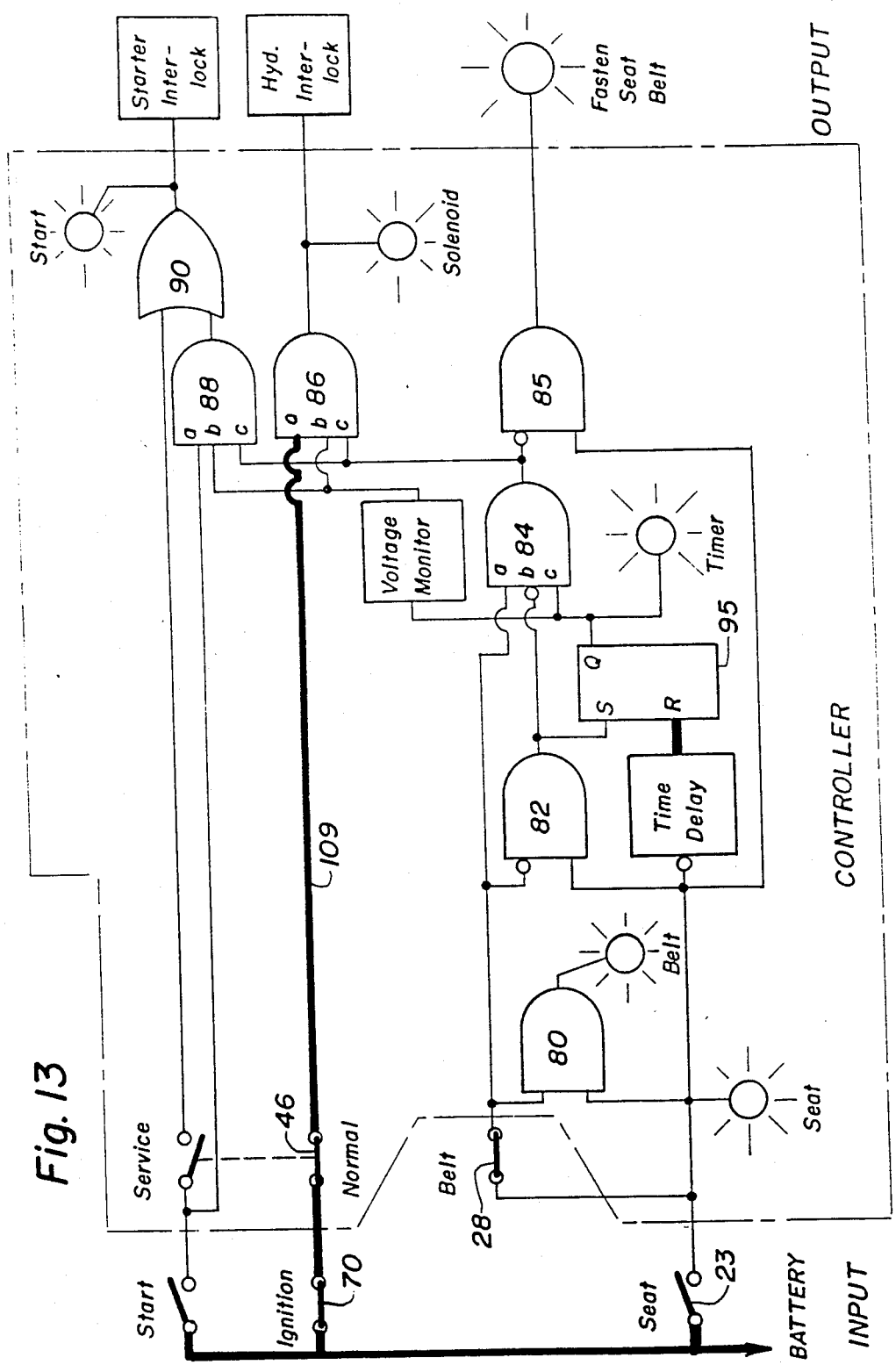

FIG. 12 depicts the operator reexerting his weight upon the seat, closing the seat switch 23, the signal is reinstated along leads 101, 103 and 105 in the same manner as reflected in FIG. 10 to reenergize the hydraulic interlock and enable the operation of the boom and bucket controls. FIG. 13 reflects the logic operation for the alternative condition, the lack of presence of the operator in the seat, i.e., leaving the seat switch 23 open, for a perio of time greater than three seconds. After three seconds of a continuous opening of the switch 23, the time delay is activated sending a signal to the reset terminal R of the Set/Reset Latch 95 turning off the Set/Reset Latch 95 and eliminating the signal from the Q terminal, which in turn eliminates a signal through the voltage monitor to the b terminals of AND-GATES 86 and 88.

Figure 14:
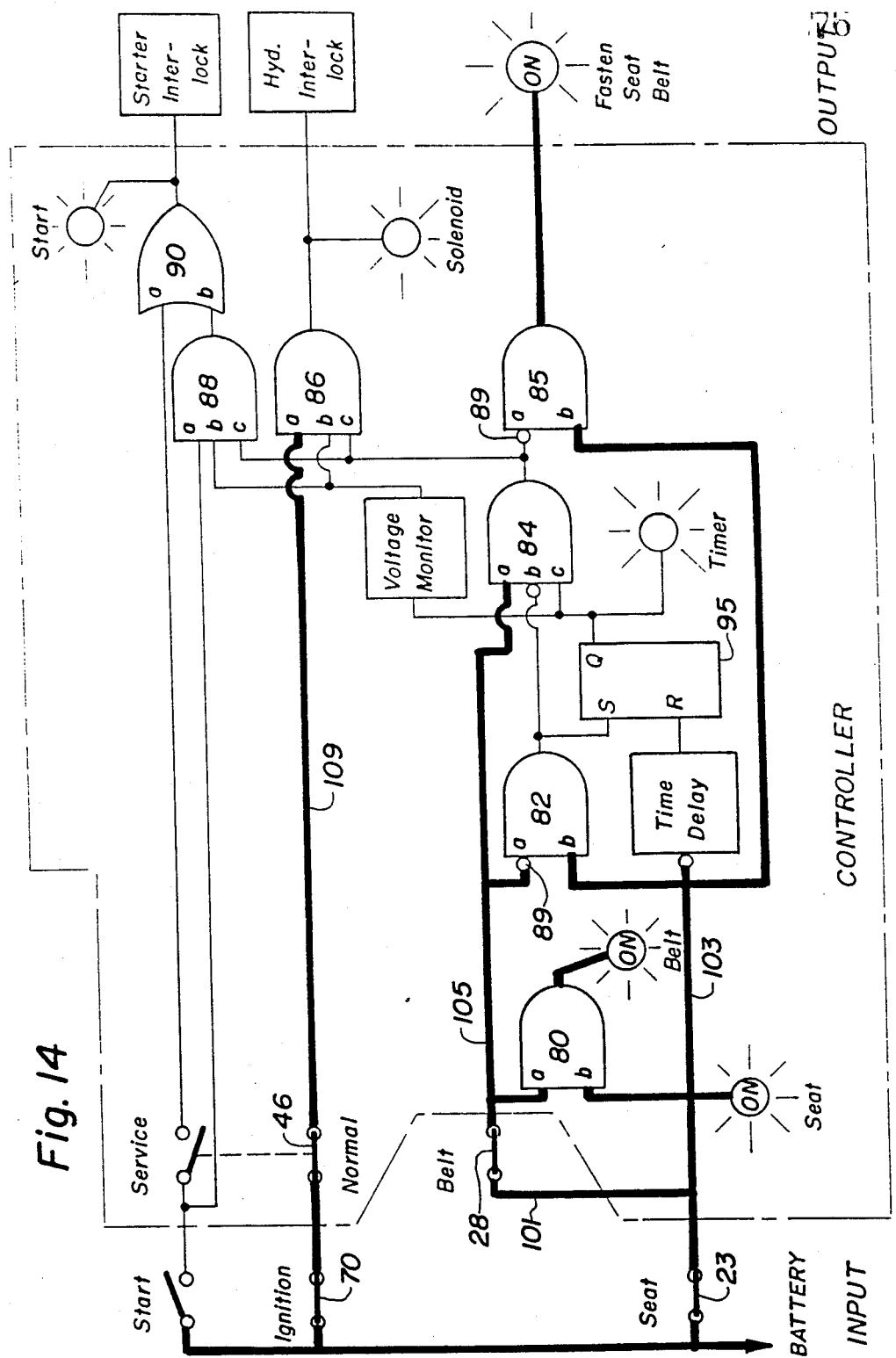

FIGS. 13 and 14 can be referred to as the anti-tie down feature. It is possible for the operator to bypass the logics of the controller as reflected in FIGS. 7 and 8 by sitting in the seat and fastening the seat belt behind the operator. As soon as the operator leaves his seat, as reflected in FIG. 11, the hydraulic interlock is deenergized preventing operation of the boom and bucket controls. Irrespective of the condition of the belt switch 28. If the operator has exited the loader 10 leaving he engine running and the seat belt fastened for a period of time greater than three seconds, the operator will find that he must resequence the closing of the seat switch 23 and the belt switch 28 to enable operation of the hydraulically actuated boom and bucket.

FIG. 14 reflects the logic operation following the scenario set forth in the preceding paragraph. The operator who has been absent from his seat for a period of time greater than three seconds returns to the seat closing the seat switch 23. The resulting signal along leads 101, 103 and 105 and the already closed belt switch 28 illuminates the seat diagnostic light, activates AND-GATE 80 to illuminate the belt diagnostic light, recharges the time delay and provides a signal to the b terminal of ANDGATE 85, the a and b terminal of ANDGATE 82 and the a terminal of ANDGATE 84. Because of the signal inverter 89 at the a terminal of ANDGATE 82, the ANDGATE 82 reads only a signal at the b terminal and does not output a signal to the set terminal S of the Set/Reset Latch 95 or to the b terminal of ANDGATE 84.

Since the Set/Reset Latch 95 had been turned off by the activation of the time delay, as reflected in FIG. 13, no signal will be transmitted from the Q terminal of the Set/Reset Latch 95 to illuminate the timer diagnostic light or provide a signal to the c terminal of AND-GATE 84 or through the voltage monitor to the b terminals of ANDGATES 86 and 88. Since ANDGATE 84 does not receive a signal at its c terminal, the lack of output from ANDGATE 84 prevents a signal from being received by terminal a of ANDGATE 85 and terminal c of ANDGATE 86 and 88. The signal inverter 89 at the a terminal of ANDGATE 85 causes ANDGATE 85 to read a signal at both the a and b terminals and, therefore, output a signal to illuminate the fasten seat belt light externally of the controller. Since ANDGATE 86 is not receiving a signal at either the b or c terminals, the hydraulic interlock is not energized and the boom and bucket controls remain inoperative.

It can be seen, therefore, that merely reclosing the seat switch 23 by sitting back down in the seat will not enable the operation of the boom and bucket. By illuminating the fasten seat belt light, the controller is telling the operator that he must resequence to enable operation of the loader. If the belt switch 28 is not closed immediately subsequent to the closing of the seat switch 23, i.e. the closing of the belt switch 28 must occur before the operator has left the seat 22 for a period of time greater than the predetermined period for the time delay to turn off the Set/Reset Latch 95, the operator will have to resequence the closing of the seat switch 23 and the belt switch 28.

Figure 15:
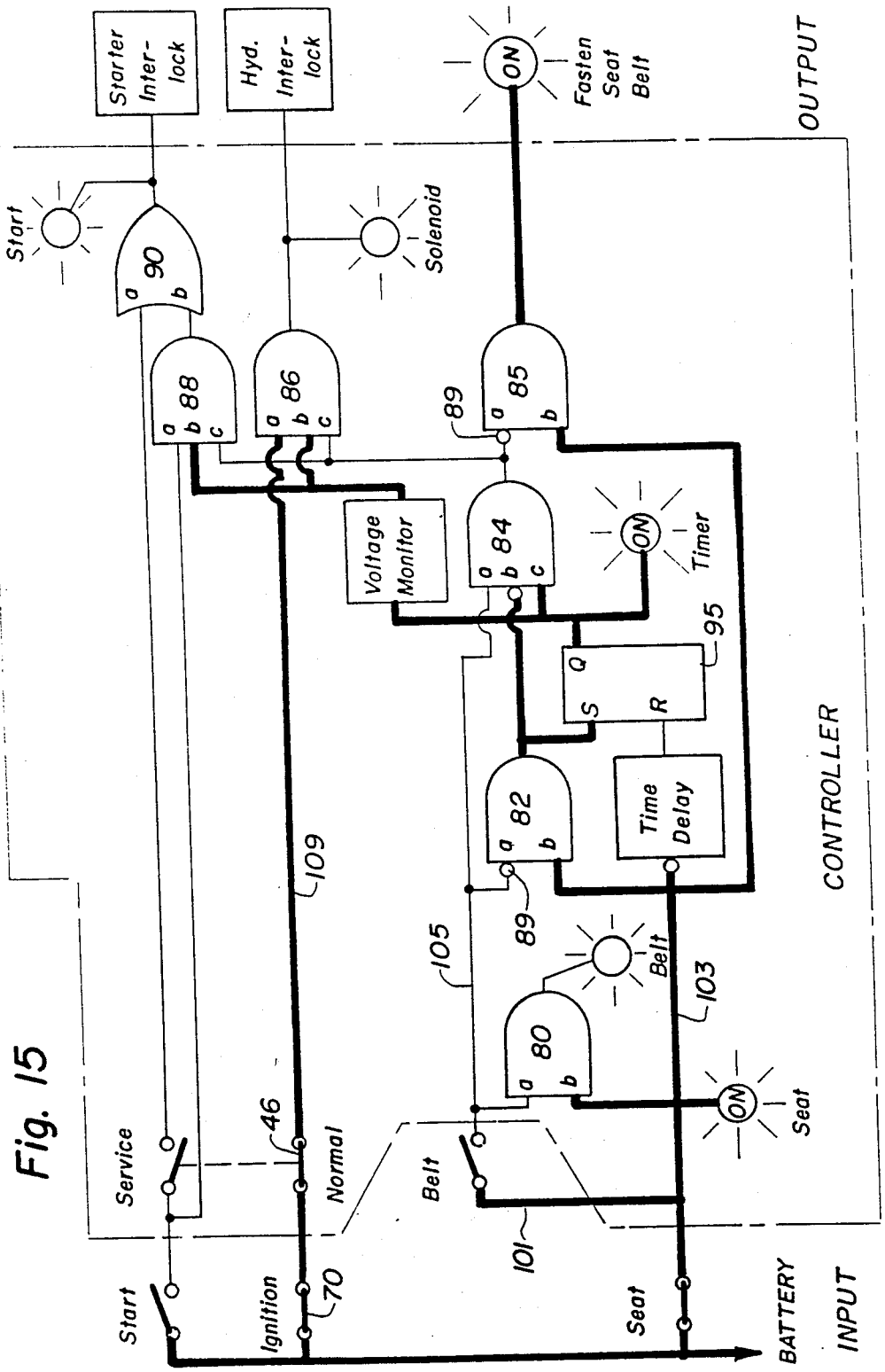

FIG. 15 depicts the subsequent operation to that described above with respect to FIG. 14, an unfastening of the seat belt and an opening of the seat belt switch 28. Removing the signal from lead 105 by the opening of the belt switch 28 removes the inverted signal from the a terminal of ANDGATE 82. The resultant output of ANDGATE 82 provides a signal to the inverted b terminal of ANDGATE 84 and to the set terminal S of the Set/Reset Latch 95. As described above with respect to FIG. 7 the output signal from terminal Q of the Set/Reset Latch 95 turns on the timer diagnostic light and provides a signal to the b terminals of ANDGATES 86 and 88. A subsequent reclosing of the belt switch 28 provides a signal identical to that described above with respect to FIG. 8, turning off the fasten seat belt light and, since the ignition switch 70 and the normal operation switch 46 have already been closed, providing a signal to the a terminal of ANDGATE 86, the logic operation will be identical to that described above with respect to FIG. 10, energizing the hydraulic interlock and enabling the operation of the boom and bucket controls.

Figure 16:
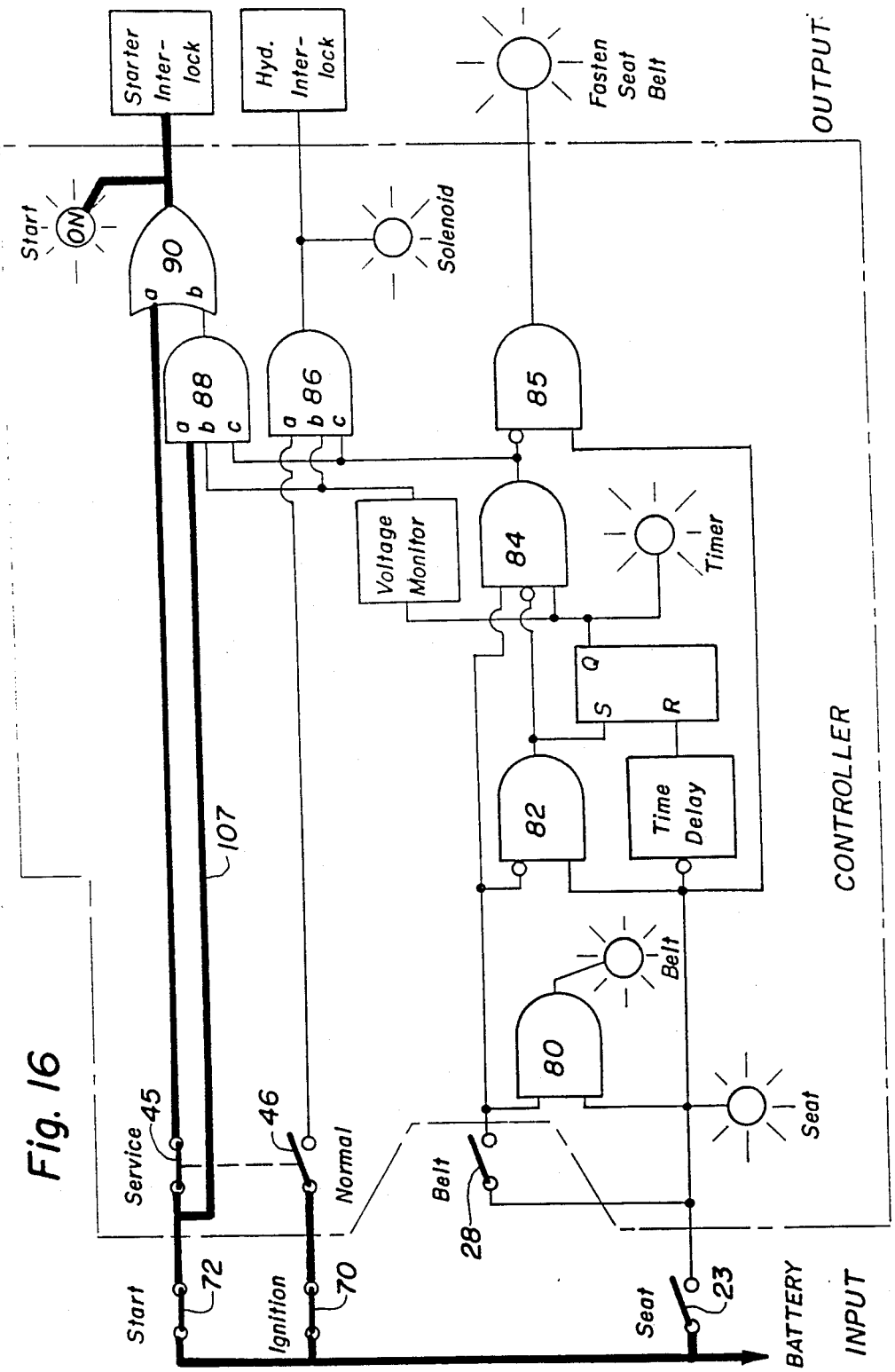
Figure 17:
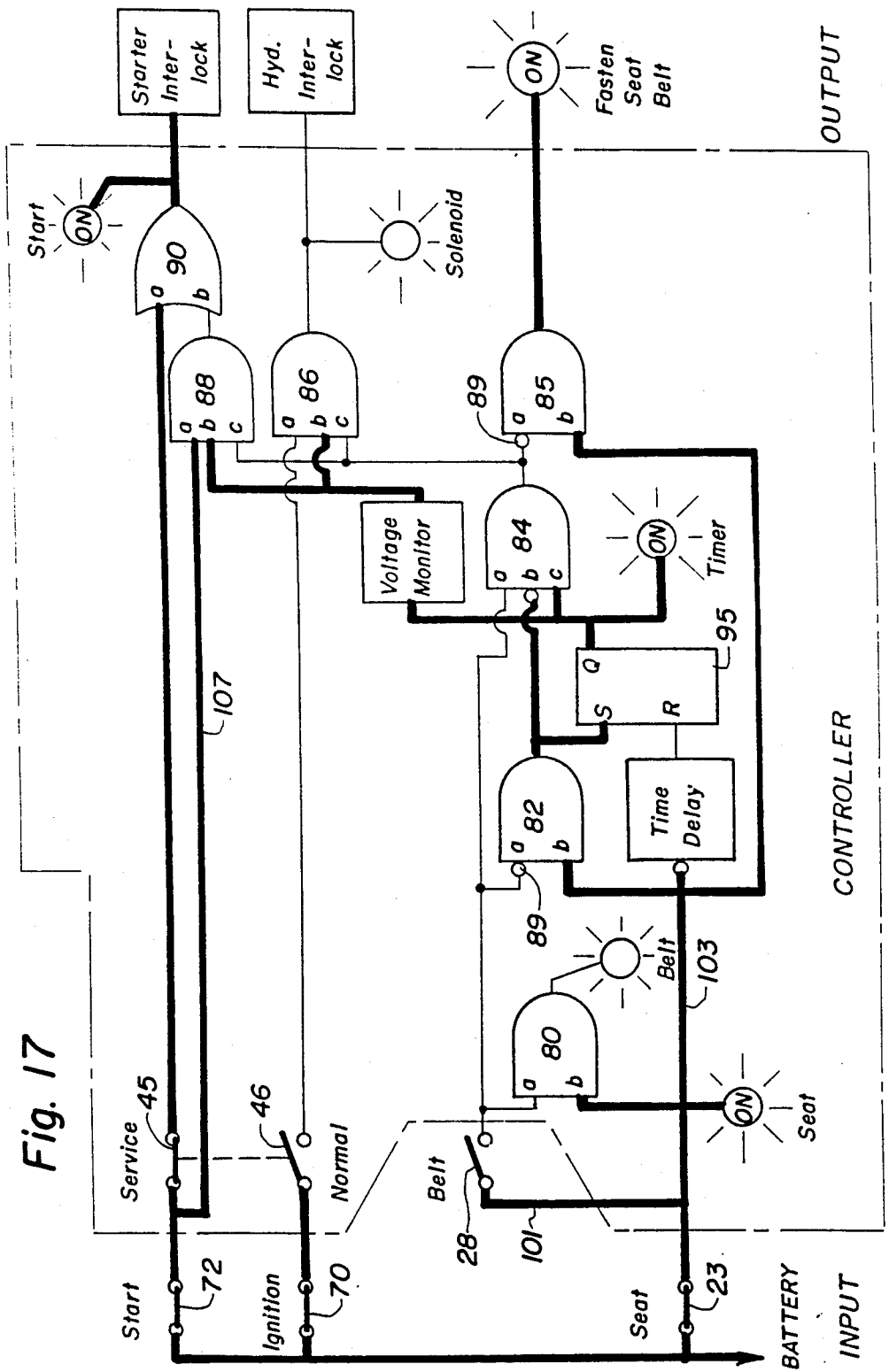
Figure 18:
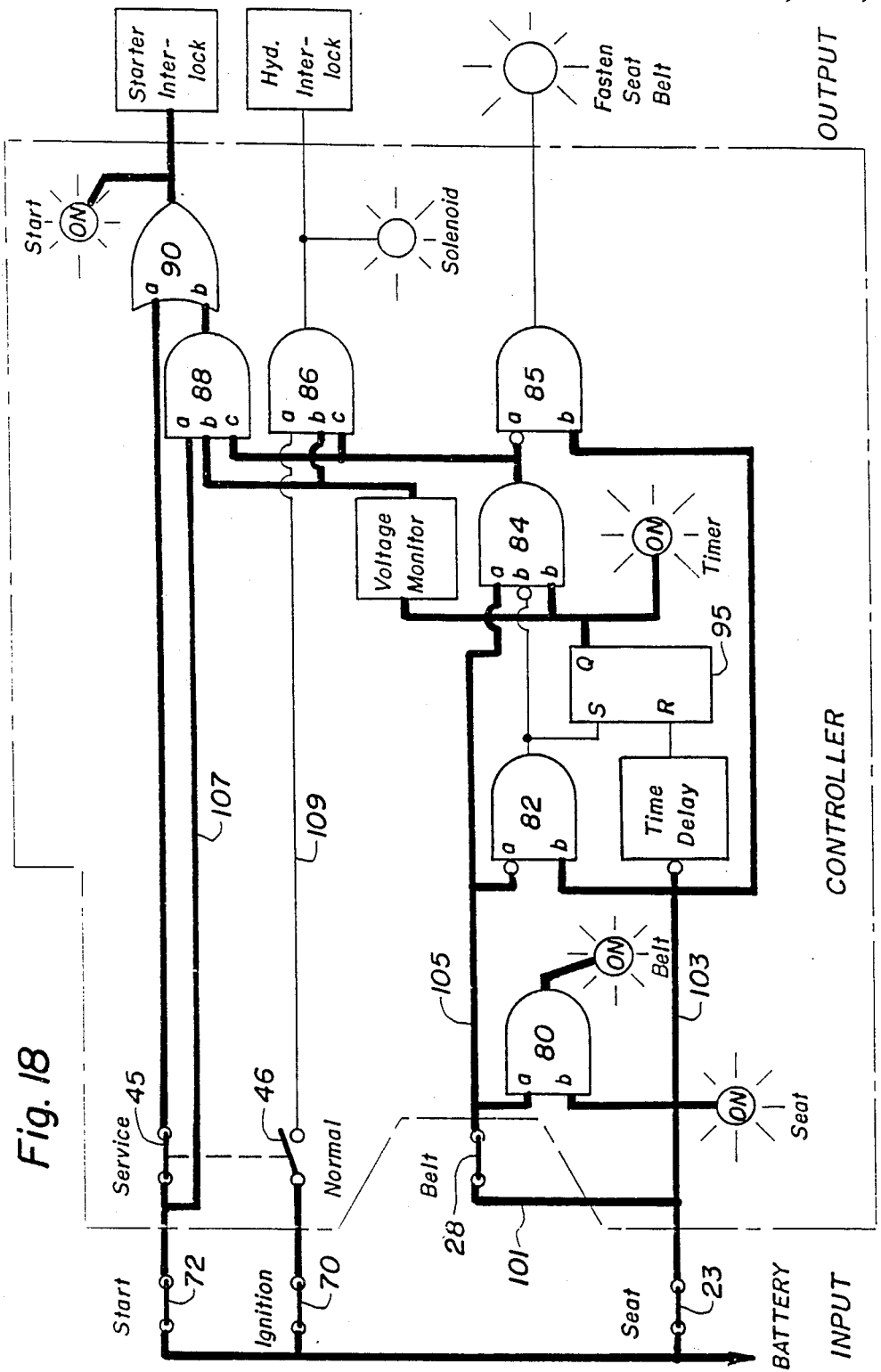

The controller also provides a service override feature depicted in FIG. 16. A closing of the service override switch 45, resulting in an opening of the normal operation switch 46, provides a signal directly to the a terminal of the ORGATE 90, the output of which illuminates the start diagnostic light and energizes the starter relay interlock. The service override feature permits the starting and running of the engine 14; however, the hydraulic interlock cannot be energized to enable operation of the working tool assembly 15. The closing of the seat switch 23 while the service override switch is closed, as reflected in FIG. 17, provides a signal along leads 101 and 103 in a manner similar to that described above with respect to FIG. 7. A subsequent closing of the seat belt and belt switch 28 with the service override switch 45 closed, as reflected in FIG. 18, will still not energize the hydraulic interlock. Although the signal path resulting from the closing of the belt switch 28 is similar to that described above with respect to FIG. 8, the lack of signal along lead 109, due to the open normal operation switch 46, to the a terminal of ANDGATE 86 prevents the ANDGATE 86 from outputting a signal energizing the hydraulic interlock.

Referring again to FIG. 17, it can be seen that the controller logic cannot be bypassed merely by starting the engine 14 using the service override switch 45, sitting in the seat 22 without buckling the seat belt 25, and then flipping the normal operation switch 46, because no signal is received at the c terminal of ANDGATE 86 to permit an enabling of the hydraulic interlock. Similarly to the logic shown in FIG. 14, if the operator first buckles the seat belt 25 and then sits in the seat 22, no signal would be sent to the b terminal of ANDGATE 86, thereby disabling the hydraulic system 30. Although it is possible to bypass the logic of this. Although it is possible to bypass the logic of this particular controller, as described above with respect to FIGS. 7–9 and FIGS. 11–15, anytime the operator leaves his seat for a period of time greater than approximately three seconds, he will have to unfasten and refasten the seat belt 25 to effect a resequencing of the closing of the seat switch 23 and the belt switch 28 to enable the operation of the working tool apparatus 15. Accordingly, it is expected to be more convenient and easier to comply with the controller logic than it is to continually try to bypass the logic.

It will be understood that changes in details, materials, steps and arrangements of parts, particularly in the electrical circuit, which have been described and illustrated to explain the nature of the invention will occur to and may be made by those skilled in the art upon the reading of this disclosure within the principals and scope of the invention. The foregoing description illustrates the preferred embodiment of the invention; however, concepts, as based upon the description may be employed in other embodiments without departing from the scope of the invention. Accordingly, the following claims are intended to protect the invention broadly as well as in the specific form shown.

Having thus described the invention, what is claimed is:

1. A method of controlling the operation of an implement having a mobile frame; an engine supported on said frame for providing operative power; a working tool apparatus supported from said frame and operably movable relative thereto; an operator compartment including a seat on which the operator sits to control operation of said implement and said working tool; and an operator restraint mechanism movable between an operative position in which the operator is restrained from leaving said seat and an inoperative position in which the operator is permitted to leave his seat, comprising the steps of:

sensing the presence of the operator in said seat;
then sensing the movement of said operator restraint mechanism into said operative position; enabling the starting of said engine only after the movement of said operator restraint mechanism into said operative position is sensed subsequent to the sensing of the presence of the operator in said seat; and
disabling the movement of said working tool apparatus unless said operator restraint mechanism is moved into said operative position subsequent to the sensing of the presence of the operator in said seat each time the operator leaves said seat.

2. The method of claim 1 wherein said implement includes a controller means operably connected to said engine to effect the disabling thereof, said step of sensing the presence of the operator includes the step of generating a first signal receivable by said controller means to indicate the presence of said operator in said seat.

3. The method of claim 2 wherein said step of sensing the movement of said operator restraint mechanism includes the step of generating a second signal receivable by said controller means to indicate the placement of said operator restraint mechanism into said operative system.

4. The method of claim 3 wherein said step of sensing the presence of the operator further includes the step of generating an inverse first signal receivable by said controller means when the operator leaves said seat, said step of sensing the movement of said operator restraint mechanism including the step of generating an inverse second signal receivable by said controller means when said operator restraint mechanism is moved into said inoperative oposition.

5. The method of claim 4 further comprising the steps of:
   disabling the movement of said working tool apparatus when said controller means receives said inverse first signal until said controller means receives said first and second signals in sequential order; and
   disabling the movement of said working tool apparatus when said controller means receives said inverse second signal until said controller means receives said second signal without having received said inverse first signal in the time interval between receiving said inverse second signal and said second signal.

6. The method of claim 5 further comprising the steps of:
   delaying the receipt of said inverse first signal by said controller means for a predetermined period of time; and
   cancelling said inverse first signal by the regeneration of said first signal for receipt by said controller means while said inverse first signal is being delayed.

7. A method of controlling the operation of an implement having a mobile frame; an engine supported on said frame for providing operative power; a working tool apparatus supported from said frame and operably movable relative thereto; an operator compartment including a seat on which the operator sits to control operation of said implement and said working tool apparatus; and an operator restraint mechanism movable between an operative position in which the operator is restrained from leaving said seat and an inoperative position in which the operator is permitted to leave his seat, comprising the steps of:
   generating a first signal when said operator sits in said seat;
   generating an inverse first signal when said operator leaves said seat;
   generating a second signal when said operator restraint mechanism is placed into said operative position;
   generating an inverse second signal when said operator restraint mechanism is placed into said inoperative position; and
   disabling said working tool apparatus unless said second signal is generated subsequent to the generation of said first signal without an intermediate generation of said inverse first signal.

8. The method of claim 7 further comprising the step of:
   disabling said working tool apparatus when said inverse second signal is generated until said second signal is regenerated.

9. The method of claim 8 further comprising the step of:
   disabling the movement of said working tool apparatus when said inverse first signal is generated until said first and second signals are generated in sequential order.

10. The method of claim 9 further comprising the step of:
    delaying said inverse first signal for a predetermined period of time so that a regeneration of said first signal during said predetermined period of time will obviate the requirement of generating said first and second signals in sequential order.

11. The method of claim 10 further comprising the step of:
    disabling the starting of said engine unless said second signal is generated subsequent to the generation of said first signal without an intermediate generation of said inverse first signal.

12. The method of claim 10 wherein said delaying step includes the step of:
    disabling the operation of said working tool apparatus during said predetermined period of time until said first signal is regenerated during said predetermined period of time, said step of disabling the movement of said working tool apparatus requiring the generation of said first and second signals in sequential order if said first signal is not generated during said predetermined period of time.

* * * * *